United States Patent [19]
Koyama et al.

[11] Patent Number: 5,393,805
[45] Date of Patent: Feb. 28, 1995

[54] EPOXY RESIN COMPOSITION FOR INSULATING A COIL, AND A COIL MOLDED FROM THE COMPOSITION

[75] Inventors: Toru Koyama; Hirokazu Takasaki; Hiroshi Suzuki, all of Hitachi; Akio Mukoh, Mito; Ikushi Kano; Toshiyuki Koide, both of Ibaraki, all of Japan

[73] Assignee: Hitachi, Ltd., Tokyo, Japan

[21] Appl. No.: 717,642

[22] Filed: Jun. 19, 1991

[30] Foreign Application Priority Data

Jun. 23, 1990 [JP] Japan .................................. 2-165398

[51] Int. Cl.⁶ .............................................. C08L 63/00
[52] U.S. Cl. ..................................... 523/400; 525/523; 528/87; 528/88; 528/90; 528/92; 528/93; 428/413; 428/414; 428/416
[58] Field of Search .......................... 523/400; 525/523; 528/87, 88, 90, 92, 93; 428/413, 414, 416

[56] References Cited

U.S. PATENT DOCUMENTS

| | | | |
|---|---|---|---|
| 3,645,899 | 2/1972 | Linson | 523/443 |
| 4,732,702 | 3/1988 | Yamazaki et al. | 523/457 |
| 4,788,233 | 11/1988 | Sakakibara et al. | 523/451 |
| 5,017,632 | 5/1991 | Bredow et al. | 523/413 |
| 5,068,267 | 11/1991 | Uchida et al. | 523/435 |

FOREIGN PATENT DOCUMENTS

| | | |
|---|---|---|
| 56-110294 | 1/1983 | Japan . |
| 59-221363 | 5/1986 | Japan . |
| 63-156327 | 6/1988 | Japan . |
| 62193931 | 2/1989 | Japan . |
| 1-190748 | 7/1989 | Japan . |
| 63100150 | 10/1989 | Japan . |

*Primary Examiner*—Melvyn I. Marquis
*Assistant Examiner*—Randy Gulakowski
*Attorney, Agent, or Firm*—Antonelli, Terry, Stout & Kraus

[57] ABSTRACT

An epoxy resin composition for insulating a coil which comprises at least one polyfunctional epoxy resin, at least one latent curing catalyst, at least one filler and at least one surfactant, wherein the ceiling is set to the acid anhydride content in the composition at 10% by weight based on the weight of the epoxy resin; and a coil molded out of said resin composition.

8 Claims, 14 Drawing Sheets

LIFETIME (HALF-LIFE OF FLEXURAL STRENGTH) (DAYS)

LIFETIME (HALF-LIFE OF FLEXURAL STRENGTH) (DAYS)

1: COIL, 2: CONDUCTOR, 3: GLASS-LINED PREPREG MICA TAPE,
4: CASTING RESIN, 5: TERMINAL

SECTIONAL VIEW ALONG THE LINE II-II'

F I G. 17A
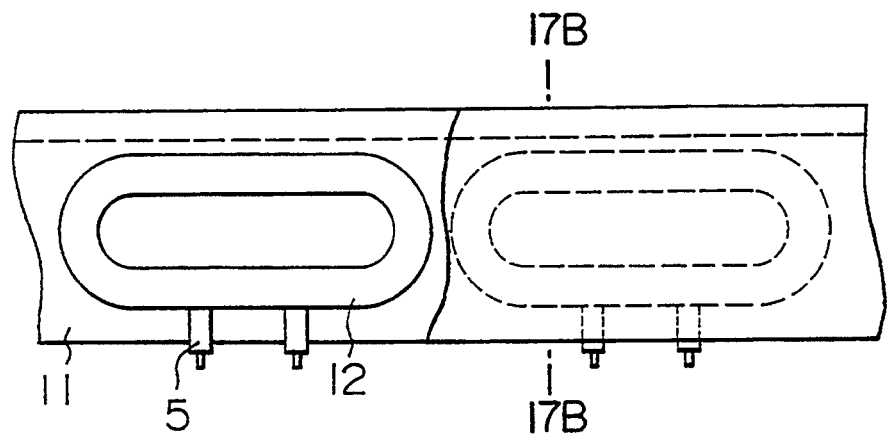
F I G. 17B
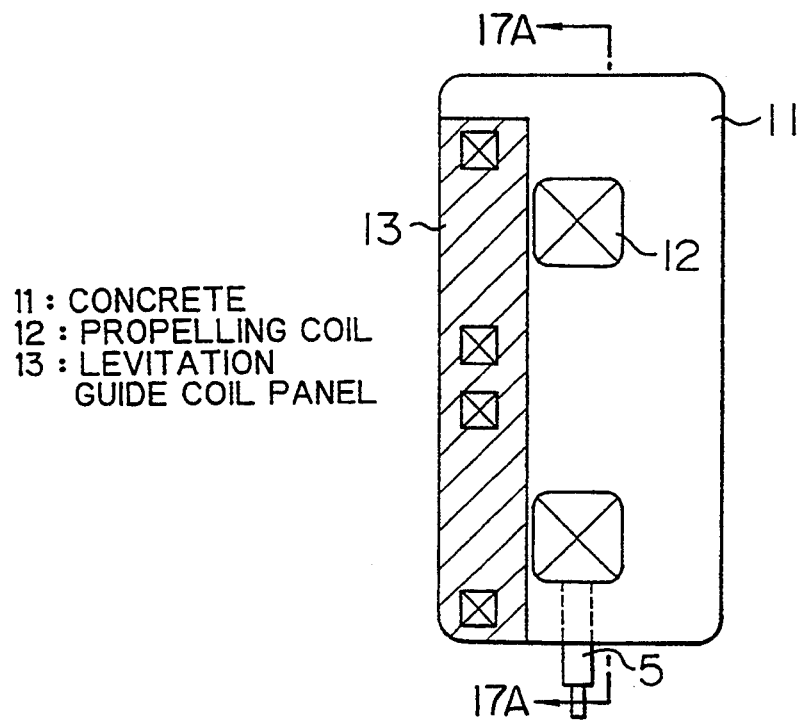
11 : CONCRETE
12 : PROPELLING COIL
13 : LEVITATION
     GUIDE COIL PANEL

14 : BOLT
16 : GROOVE

15 : SPACER

21 AND 21': MOLDS, 22: AL CONDUCTOR,
24: CASTING RESIN, 25: SPACER

EPOXY RESIN COMPOSITION FOR INSULATING A COIL, AND A COIL MOLDED FROM THE COMPOSITION

BACKGROUND OF THE INVENTION

The present invention relates to an epoxy resin composition for insulating a coil which has a low viscosity before curing and a high alkali resistance after curing, and a coil molded from the resin composition.

In recent years, there have been increased high-voltage coils used in an alkaline atmosphere, for example, rotating-armature coils used in chemical factories and the like, and ground coils for linear motor car.

Techniques for insulating such high-voltage coils have been markedly advanced. In particular, casting methods using solventless, thermosetting resin compositions have been rapidly developed in the fields of high-voltage coils of direct-current motors for vehicle, direct-current motors for general industry, transformers, etc., which are used under severe conditions, because the casting methods bring about, for example, (1) high electrical reliability,
(2) satisfactory heat dissipation, and
(3) high moisture resistance.

Conditions which the aforesaid solventless, thermosetting resin compositions should satisfy are as follows:

(1) They should have such a low viscosity that casting into a coil is easy.
(2) They should have a long pot life.
(3) They should not form voids (should not produce volatile substances) during heat curing.
(4) Electrical and mechanical properties of the resin after curing should be excellent.

Of solventless, thermosetting resin compositions satisfying these conditions, those containing an acid-anhydride-hardening epoxy resin having a low viscosity and good electrical properties have been used.

The above-mentioned rotating-armature coils used in chemical factories and the like, or ground coils for linear motor car which are embedded in concrete, are exposed to an alkaline atmosphere.

Concretes contain generally 40 to 45% by weight of water at the time of preparation. Finally, the water content in concretes becomes 15 to 20% by weight. With the progress of setting, concretes release alkaline ions such as Ca ion, Na ion and K ion, so that an aqueous solution in the pores of concretes becomes highly alkaline. Even after the lapse of 10 years, the alkali concentration of such a solution is about 0.5 mole/liter, namely, the pH is about 13 or higher.

It was found that when exposed to such a strongly alkaline atmosphere, the above-mentioned acid-anhydride-hardening epoxy resins are reduced by one half in flexural strength in 1 to 3 years. Thus, there has been desired a casting resin for coil which has a high alkali resistance.

Therefore, the present inventors have conducted various researches on the alkali resistance of resins for electrical insulation, in particular, their characteristics in the case where they are allowed to contact with concrete. As a result, the present inventors have hardening that the low alkali resistance of acid-anhydride-setting epoxy resins is caused by hydrolysis of ester linkage formed by the reaction between an acid anhydride as a curing agent and an epoxy resin, by an alkali.

On the other hand, epoxy resin compositions are widely used in the fields of civil engineering and construction for the purpose of, for example, repairing or bonding a concrete structure, protecting the surface of concrete, bonding concrete to a reinforcing steel material, lining the inner surface of a tank made of concrete, etc., and lining concrete and a floor material. This is because the compatibility between concrete and epoxy resins is good (JP-A-63-186723, JP-A-63-19396 and JP-A-64-75582).

In general, curing agents for epoxy resins used in the fields of civil engineering and construction are aliphatic amines, modified aliphatic amines, polyamides, polyamideamines, aromatic amines, modified aromatic amines, polythiols, etc. However, applying the epoxy resin compositions used in the fields of civil engineering and construction to insulation of the above-exemplified high-voltage coils brings about the following disadvantages. The above conventional epoxy resin compositions, when prepared by being diluted with a solvent for lowering the viscosity and applied, form voids during curing and results in a cured product of low dielectric strength. On the other hand, solventless resin compositions have such a high viscosity that they cannot be casted without forming voids.

Furthermore, the epoxy resin compositions have, for example, the following defects. They have a short pot life and is greatly shrunk during curing. They have a thermal expansion coefficient larger than that of the conductor of a coil, so that cracks are formed in molded resin by thermal stress during molding of the coil or a heat cycle, resulting in unsatisfactory insulation.

An object of the present invention is to provide an epoxy resin composition for insulating a coil which has a long pot life, a low viscosity and a good workability before curing, and has a high alkali resistance in the presence of an alkali for a long period of time (for example, the half-life of strength is 15 years or more) after curing; and a coil molded out of said resin.

SUMMARY OF THE INVENTION

According to the present invention, there are provided:

(1) an epoxy resin composition for insulating a coil which comprises at least one polyfunctional epoxy resin, at least one latent curing catalyst, at least one filler and at least one surfactant, the ceiling being set to the acid anhydride content in the composition at 10% by weight or less based on the weight of the epoxy resin; and (2) an epoxy resin composition for insulating a coil which comprises at least one polyfunctional epoxy resin, at least one latent curing catalyst and at least one filler, the half-life of the flexural strength of a heat-cured product obtained by heating the composition at 180° C. being 100 days or more when the heat-cured product is immersed in an alkali solution having a temperature of 60° C. and a pH of 13, or brought into contact with concrete in an atmosphere of 60° C. and 100% RH.

An essential feature of the epoxy resin composition of the present invention is that the ceiling is set to the acid anhydride content in the composition at 10% by weight or less based on the weight of the epoxy resin. When the acid anhydride content exceeds 10%, such an epoxy resin composition gives a cured product of low alkali resistance and mechanical strength. In contrast, a substantially acid anhydride-free epoxy resin composition gives a cured product of high alkali resistance.

BRIEF DESCRIPTION OF THE DRAWINGS

FIGS. 17 to 20 are partially sectional front views and enlarged sectional side views of ground propelling coil panels for linear motor car.

DETAILED DESCRIPTION OF THE INVENTION

Figure 2:
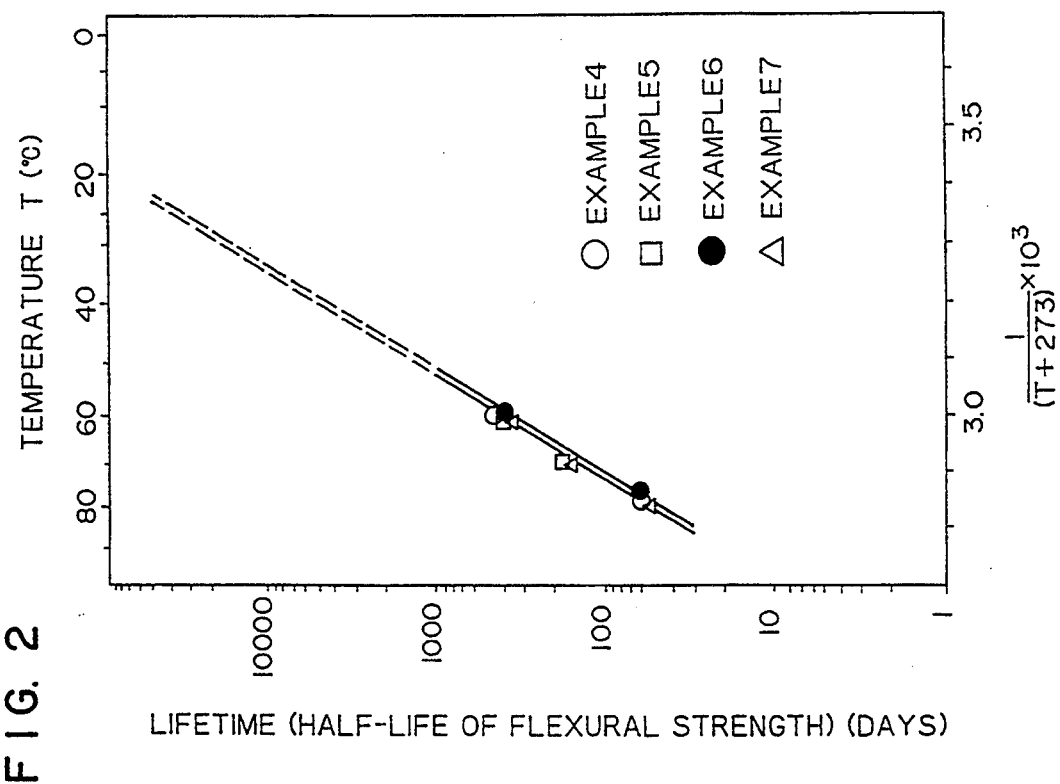
FIGS. 1 to 15 are graphs showing the relationships between the half-life of the flexural strength of a flexural test piece and the reciprocal of absolute temperature.
Figure 1:
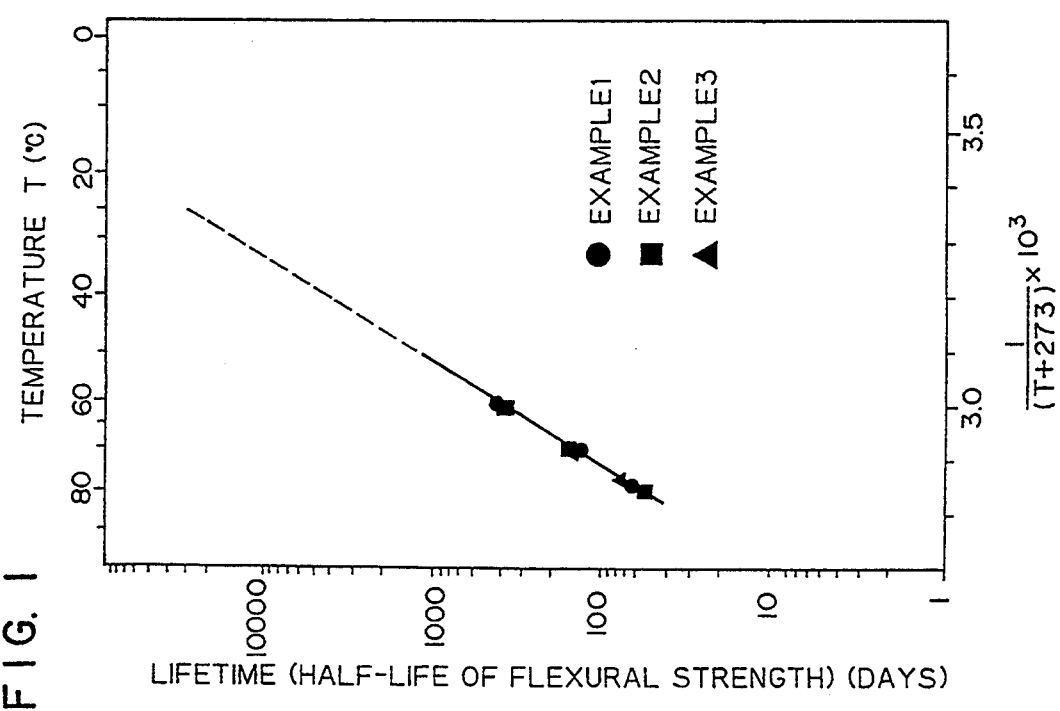
Figure 4:
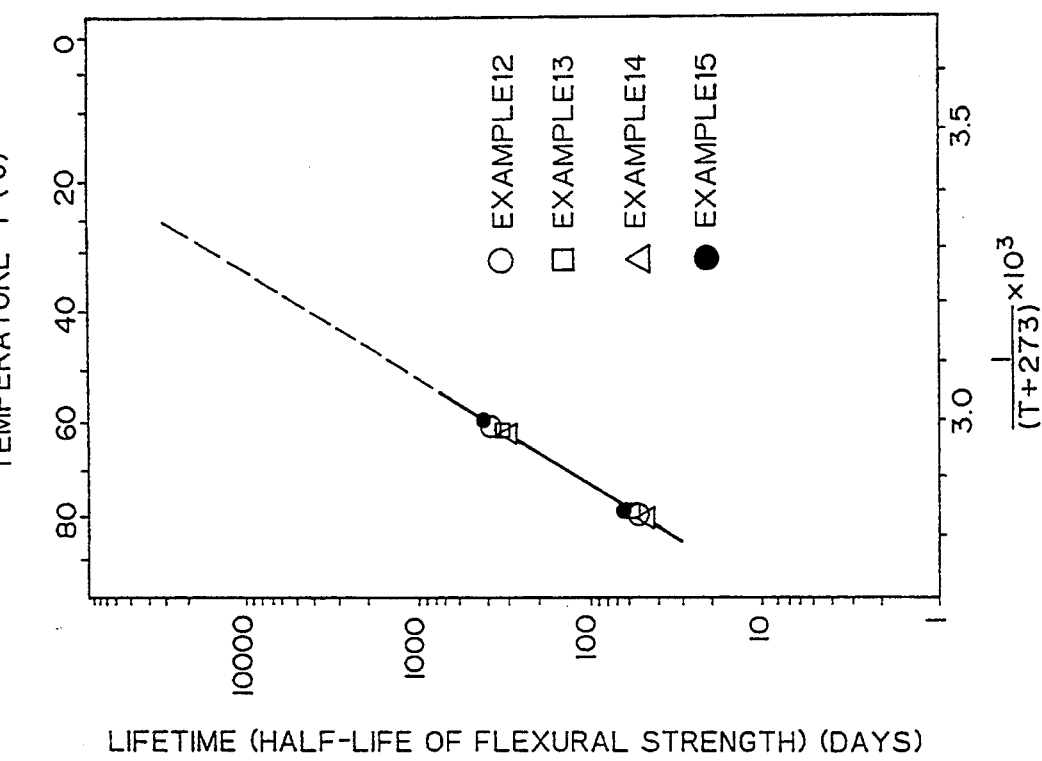
Figure 3:
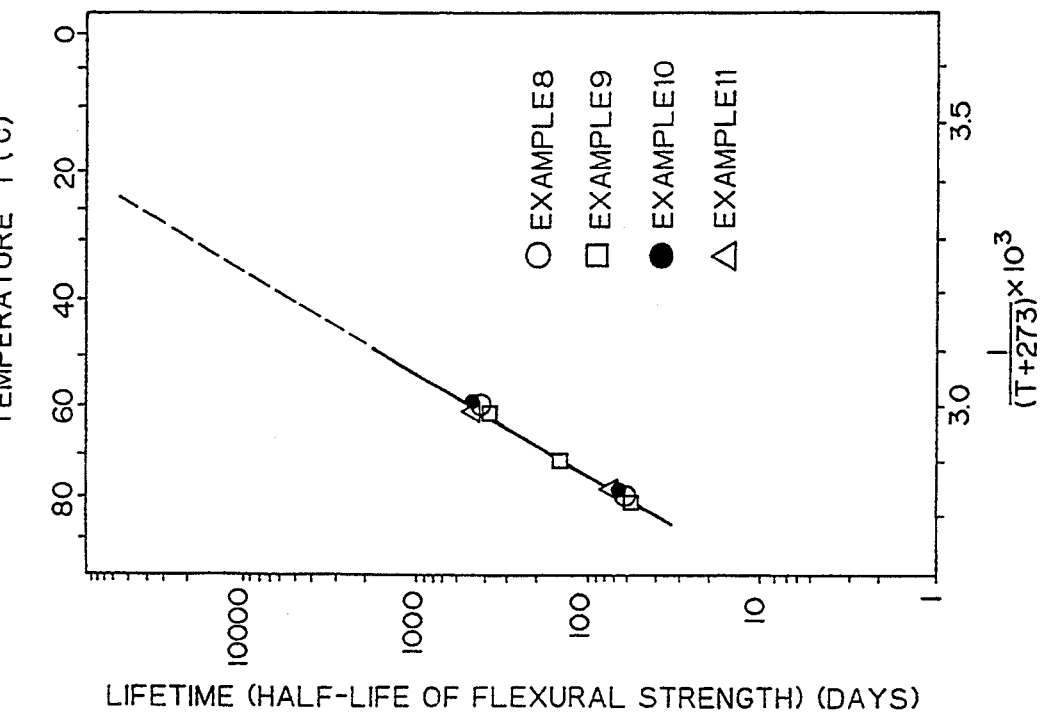
Figure 5:
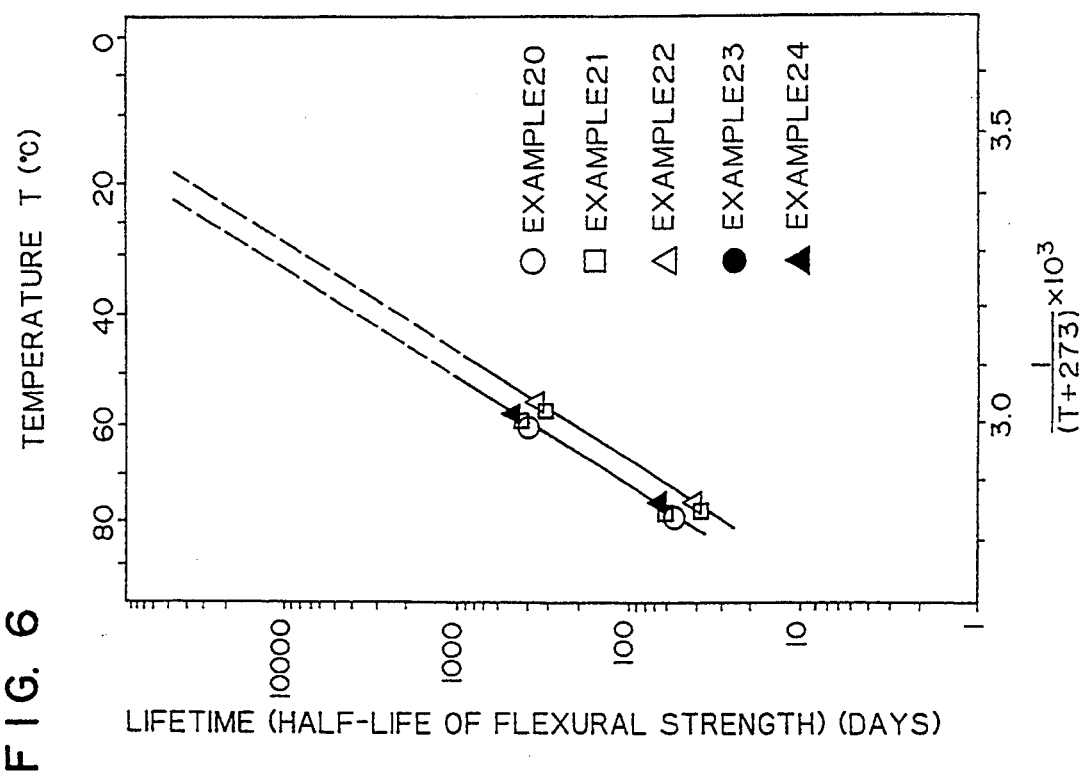
Figure 6:
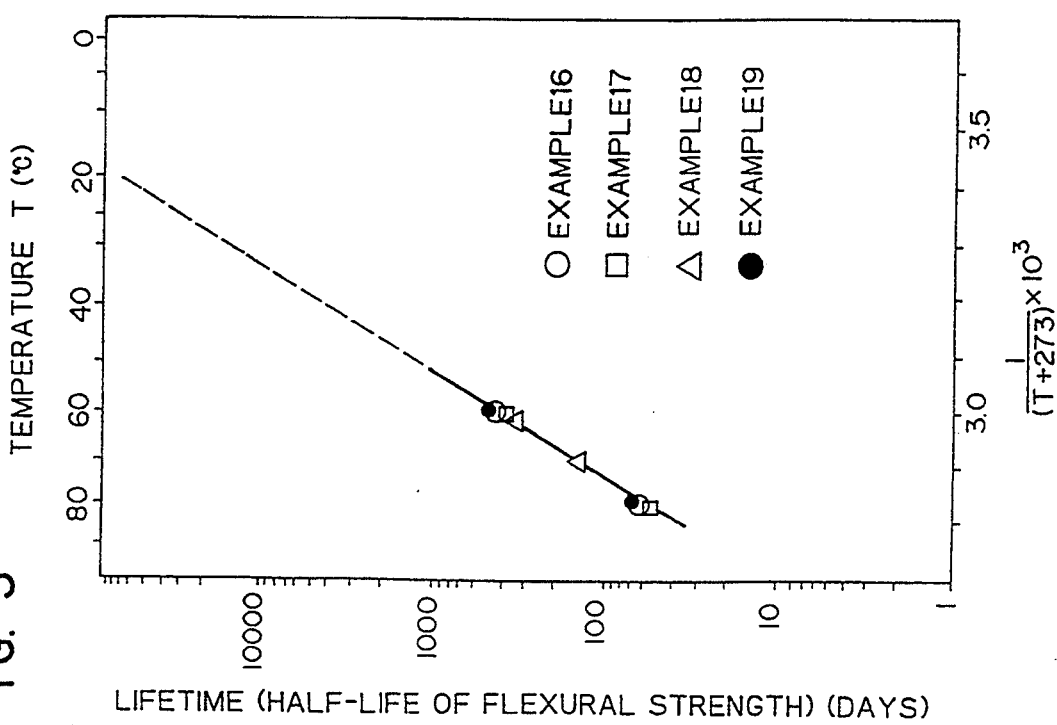
Figure 8:
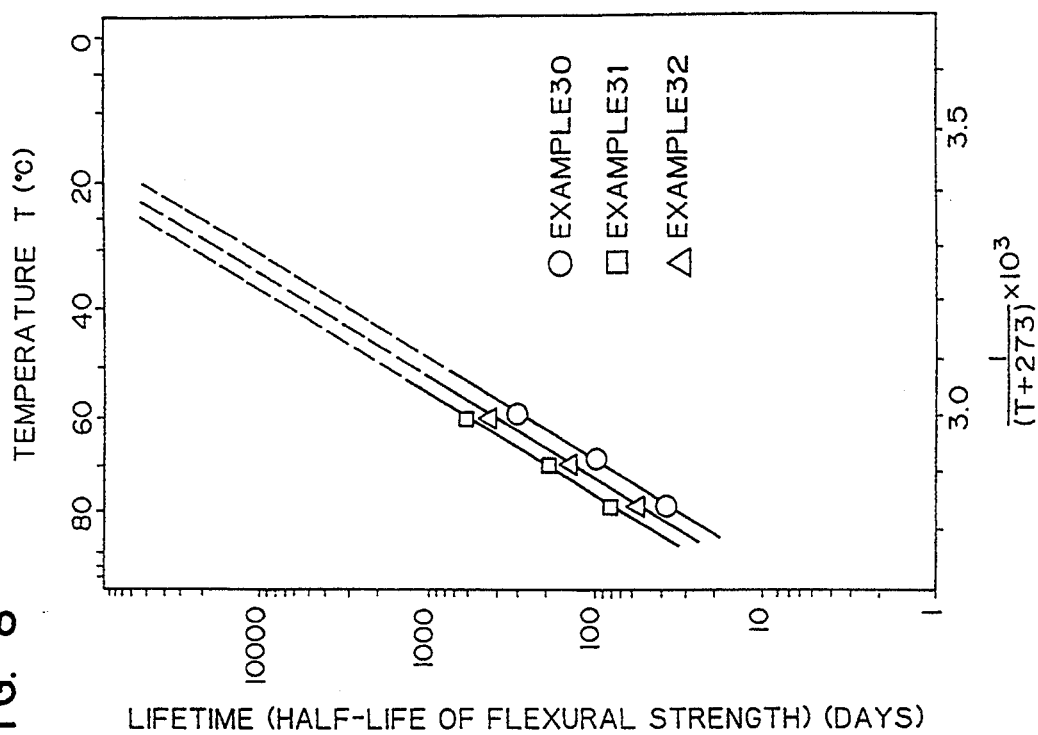
Figure 7:
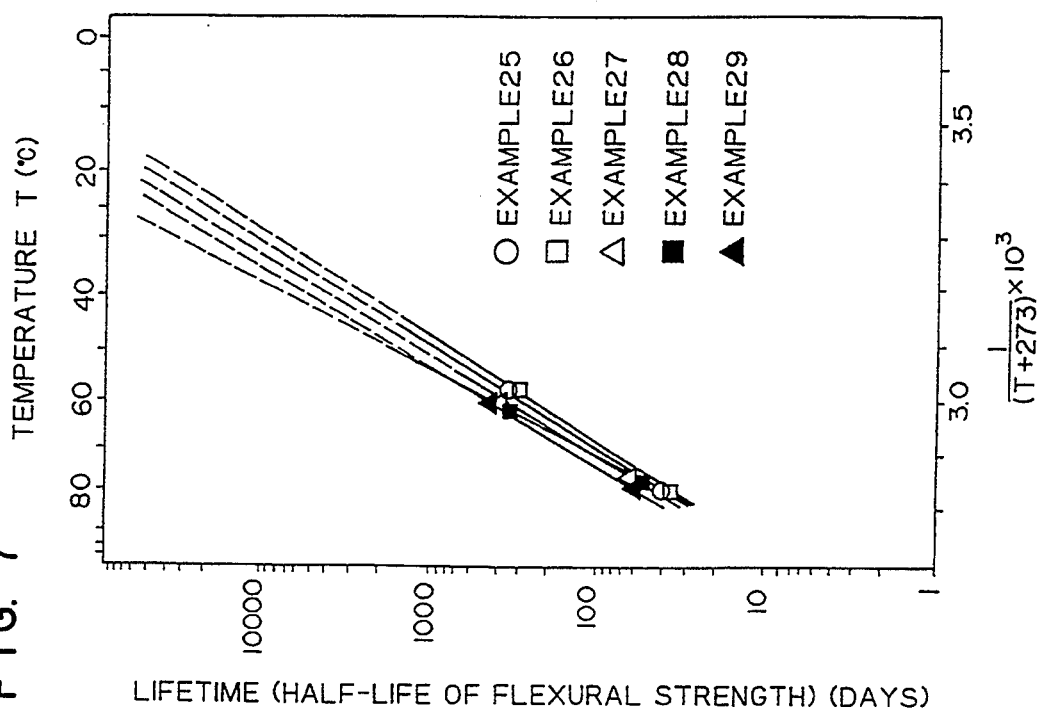

The polyfunctional epoxy resin has two or more epoxy groups in the molecule and includes, for example, bifunctional epoxy resins such as epoxy resins derived from diglycidyl ether of bisphenol A, diglycidyl ether of bisphenol F, diglycidyl ether of bisphenol AF, diglycidyl ether of bisphenol AD, diglycidyl ether of hydrogenated bisphenol A, diglycidyl ether of 2,2-(4-hydroxyphenyl)nonadecane, 4,4'-bis(2,3-epoxypropyl)-diphenyl ether, 3,4-epoxycyclohexylmethyl-(3,4-epoxy)cyclohexanecarboxylate, 4-(1,2-epoxypropyl)-1,2-epoxycyclohexane, 2-(3,4-epoxy)cyclohexyl-5,5-spiro(3,4-epoxy)-cyclohexane-m-dioxane or 3,4-epoxy-6-methylcyclohexylmethyl-4-epoxy-6-methylcyclohexanecarboxylate; butadiene-modified epoxy resins; urethane-modified epoxy resins; thiol-modified epoxy resins; epoxy resins derived from diglycidyl ether of diethylene glycol, diglycidyl ether of triethylene glycol, diglycidyl ethers of polyethylene glycols, diglycidyl ethers of polypropylene glycols, diglycidyl ether of 1,4-butanediol, diglycidyl ether of neopentyl glycol, diglycidyl ethers of bisphenol A and a propylene oxide adduct, diglycidyl ethers of bisphenol A and an ethylene oxide adduct, etc.; and trifunctional epoxy resins such as tris[p-(2,3-epoxypropoxy)phenyl]methane, 1,1,3-tris[p-(2,3-epoxypropoxy)phenyl]butane, etc.

The polyfunctional epoxy resins also include epoxy resins derived from glycidylamines such as tetraglycidyldiaminodiphenylmethane, triglycidyl-p-aminophenol, triglycidyl-m-aminophenol, diglycidylamine, tetraglycidyl-m-xylylenediamine, tetraglycidyl-bisaminomethylcyclohexane or the like; phenolic novolak type epoxy resins; cresol novolak type epoxy resins, etc.

There can also be used polyfunctional epoxy resins obtained by reacting one or more polyhydric phenols selected from bis(4-hydroxyphenyl)methane, bis(4-hydroxyphenyl)ethane, bis(4-hydroxyphenyl)propane, tris(4-hydroxyphenyl)alkanes, tetrakis(4-hydroxyphenyl)alkanes, etc. with epichlorohydrin, because such epoxy resins have a low viscosity and a good workability before curing and a high heat resistance after curing.

The tris(4-hydroxyphenyl)alkanes include tris(4-hydroxyphenyl)methane, tris(4-hydroxyphenyl)ethane, tris(4-hydroxyphenyl)propane, tris(4-hydroxyphenyl)butane, tris(4-hydroxyphenyl)hexane, tris(4-hydroxyphenyl)heptane, tris(4-hydroxyphenyl)octane, tris(4-hydroxyphenyl)nonane, etc.

There may also be used tris(4-hydroxyphenyl)alkane derivatives such as tris(4-hydroxydimethylphenyl)methane and the like.

The tetrakis(4-hydroxyphenyl)alkanes include tetrakis(4-hydroxyphenyl)methane, tetrakis(4-hydroxyphenyl)ethane, tetrakis(4-hydroxyphenyl)propane, tetrakis(4-hydroxyphenyl)butane, tetrakis(4-hydroxyphenyl)hexane, tetrakis(4-hydroxyphenyl)heptane, tetrakis(4-hydroxyphenyl)octane, tetrakis(4-hydroxyphenyl)nonane, etc.

There may also be used tetrakis(4-hydroxyphenyl)alkane derivatives such as tetrakis(4-hydroxydimethylphenyl)methane and the like.

From the viewpoint of viscosity, the following polyfunctional epoxy resins are useful: epoxy resins derived from diglycidyl ether of bisphenol A, diglycidyl ether of bisphenol F, diglycidyl ether of bisphenol AF, diglycidyl ether of bisphenol AD, tetraglycidyldiaminodiphenylmethane, triglycidyl-p-aminophenol, triglycidyl-m-aminophenol, diglycidylamine, tetraglycidyl-mxylylenediamine, or tetraglycidyl-bisaminomethylcyclohexane.

The above-exemplified polyfunctional epoxy resins can be used alone or in combination of two or more thereof. For lowering the viscosity, there may be copolymerized a monofunctional epoxy compound such as butyl glycidyl ether, styrene oxide, phenyl glycidyl ether, allyl glycidyl ether, etc. However, whether the monofunctional epoxy resins are used or not should be determined depending on purposes because they deteriorates the heat resistance.

The latent curing catalyst is not critical and any compound may be used as the latent curing catalyst so long as it lies stable in a reaction system at room temperature but accelerates the reaction of the polyfunctional epoxy resin when the temperature of the system is elevated above a prescribed temperature. Such a compound includes, for example, quaternary ammonium salts such as cetyltrimethylammonium bromide, cetyltrimethylammonium chloride, cetyltrimethylammonium iodide, dodecyltrimethylammonium bromide, dodecyltrimethylammonium chloride, dodecyltrimethylammonium iodide, benzyldimethyltetradecylammonium chloride, benzyldimethyltetradecylammonium bromide, allyldodecyltrimethylammonium bromide, benzyldimethylstearylammonium bromide, stearyltrimethylammonium chloride, benzyldimethyltetradecylammonium acetylate, etc.; microcapsules of tertiary amines such as trimethylamine, triethylamine, tetramethylbutanediamine, triethylenediamine, etc.; microcapsules of amines such as dimethylaminoethanol, dimethylaminopentanol, tris(dimethylaminomethyl)phenol, N-methylmorpholine, etc.; microcapsules of imidazole derivatives such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-phenylimidamole, 1-cyanoethyl-2-methylimidazole, 1-cyanoethyl-2-undecylimidazole, 1-azine-2-methylimidazole, 1-azine-2-undecylimidazole, etc.; metal salts of any one of the above-exemplified amines or imidazole derivatives with zinc octanoate, cobalt, etc.; 1,8-diaza-bicyclo[5.4.0]-undecene-7; N-methyl-piperazine; tetramethylbutylguanidine; amine tetraphenylborates such as triethylammonium tetraphenylborate, 2-ethyl-4-methylimidazole tetraphenylborate, 1,8-diaza-bicyclo[5.4.0]-undecene-7-tetraphenylborate, etc.; triphenylphosphine; triphenylphosphonium tetraphenylborate; aluminum trialkylacetoacetates; aluminum trisacetylacetoacetate; aluminum alcoholates; aluminum acylate; sodium alcoholates;

boron trifluoride; complex salts of boron trifluoride and an amine or imidazole derivative; diphenyliodonium salt of HAsF$_6$; aliphatic sulfonium salts; amineimides obtained by reacting a monocarboxylic acid alkyl ester, a hydrazine derivative and a monoepoxy compound; and metal soaps of octylic acid or naphthenic acid and cobalt, manganese, iron or the like.

Such latent curing catalysts are added usually in an amount of 0.1 to 10% by weight based on the weight of the polyfunctional epoxy resin.

Unless a filler is added, the cured product of the epoxy resin composition shows a marked cure shrinkage and has a thermal expansion coefficient larger than the conductor of a coil. Therefore, a large thermal stress is produced during the production of coil or by a heat cycle, so that the cured product of epoxy resin is cracked, resulting in dielectric breakdown of the coil.

Addition of a filler has, for example, the following advantages:

(1) The cure shrinkage is reduced.

(2) The epoxy resin composition has a low thermal expansion coefficient close to that of the conductor of a coil, so that only small thermal stress is produced.

(3) The epoxy resin composition has a high thermal conductivity, resulting in satisfactory heat dissipation.

Therefore, the addition of a filler is indispensable for improving the reliability of the coil. The filler itself preferably has an alkali resistance.

On the other hand, the addition of a filler has the following disadvantages:

(1) The viscosity of the resulting composition is increased, so that casting thereof becomes difficult.

(2) Cracking or water permeation tends to occur from the boundary surface between the filler and the resin, whereby the cured product tends to become fragile.

(3) When the filler is precipitated during curing, a nonhomogeneous insulating layer is formed.

Therefore, these disadvantages should be taken into consideration when the filler is used.

Such a filler includes silica, quartz glass, alumina, hydrated alumina, hydrated magnesium, calcium carbonate, zirconium silicate, calcium silicate, talc, clay, mica, wollastonite, microdol (a trade name for ground dolomite), pearlite, bentonite, aluminum silicate, calcium hydrogencarbonate, silicon carbide whisker, potassium titanate whisker, glass fiber powder, etc.

These fillers may be used alone or in combination of two or more thereof. For increasing the strength, it is recommendable to use a mixture of a powdered filler and a fibrous filler.

In particular, alumina having a purity of 99.9% or more, a Na$_2$O content of 0.05% or less, an average particle size of 2.5 to 10 μm, and a content of particles having a diameter of not less than 80 μm of 1% or less, is useful from the viewpoint of alkali resistance, viscosity and precipitation.

The amount of the filler added is preferably such that the thermal expansion coefficient of the resin after curing is in the range of ±50%, preferably ±10%, of the thermal expansion coefficient of the conductor of a coil.

Between the thermal expansion coefficient α of the resin after curing and the amount V (content by volume) of the filler added, there is the relationship expressed by the following equation, and the amount of the filler added can be determined by calculation.

$$\alpha = \alpha_2 - \left[ \frac{3(1 - \nu_1)(\alpha_2 - \alpha_1)\gamma V}{2(1 - 2\nu_1)\nu V + (1 + \nu_2) + 2(1 - 2\nu_1)(1 - \gamma V) \times \frac{E_2}{E_1}} \right]$$

wherein
$\alpha_1$: thermal expansion coefficient of the filler,
$\alpha_2$: thermal expansion coefficient of the matrix resin,
$\nu_1$: Poisson ratio of the filler,
$\nu_2$: Poisson ratio of the matrix resin,
$a$: correction factor,
$E_1$: modulus of elasticity of the filler,
$E_2$: modulus of elasticity of the matrix resin.

In general, the amount of the filler added is preferably 45 to 65% by volume based on the volume of the whole composition, for achieving the objects of the present invention.

The viscosity of an epoxy resin composition containing no filler which is subjected to casting is generally 10 poises or less. When the filler is added, the viscosity is increased as described above. Therefore, the casting temperature should be higher than that employed in the case where no filler is added. However, when a high casting temperature is employed, curing proceeds undesirably rapidly during casting. For maintaining the viscosity of the composition at 100 poises or less during casting, it is important to use a latent curing catalyst which lies stable in a reaction system at low temperatures but promptly reacts when the temperature of the system is elevated above a critical temperature.

A surfactant for improving the wetting of the epoxy resin and the filler is necessary for avoiding cracking and water permeation from the boundary surface between the filler and the resin. The surfactant includes, for example, silane-type surfactants such as γ-chloropropyltrimethoxysilane, vinyltrichlorosilane, vinyltriethoxysilane, vinyltrimethoxysilane, vinyl.tris(β-methoxyethoxy) silane, γ-methacryloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, γ-ureidopropyltriethoxysilane, etc.; titanate-type surfactants such as 2-n-buthoxycarbonyl benzoyloxy tri(n-buthoxy)titanate, isopropyl isostearoyltitanate, isopropyl trioctanoyltitanate, isopropyl methacryloylisostearoyltitanate, isopropyl tridodecyltitanate, isopropyl isostearoyldiacryltitanate, isopropyl tris(dioctylphosphate) titanate, isopropyl tricumylphenyltitanate, isopropyl tris(dioctylpyrophosphate) titanate, isopropyl tris(n-aminoethyl-aminoethyl)titanate, tetraisopropyl bis(dioctylphosphite) titanate, tetraoctyl bis(didodecylphosphite) titanate, tetra(2,2-diallyloxymethyl-1-butyl) bis(ditridecyl)phosphite titanate, diisostearoylethylene titanate, bis(dioctylpyrophosphate)ethylene titanate, etc.; aluminum-containing surfactants such as ethyl acetoacetate aluminum diisopropylate, aluminum tris(ethyl acetoacetate), etc.; and zirconium-containing surfactants.

Of the above-exemplified surfactants, there are preferably used γ-glycidoxypropyltrimethoxysilane, β-(3,4-epoxycyclohexyl)ethyltrimethoxysilane, γ-mercaptopropyltrimethoxysilane, γ-aminopropyltriethoxysilane, N-β-(aminoethyl)-γ-aminopropyltrimethoxysilane, isopropyl isostearoyltitanate, isopropyl trioctanoyltitanate, ethyl acetoacetate aluminum diisopropylate, and aluminum tris(ethyl acetoacetate).

The above-exemplified surfactants may be used alone or in combination of two or more thereof. It is particularly preferable to use monofunctional surfactants such as isopropyl isostearoyltitanate, isopropyl trioctanoyltitanate, etc. together with polyfunctional surfactants such as γ-glycidoxypropyltrimethoxysilane, β-(3,4-epoxycyclohexyl)ethyltrimethoxysilane, γ-mercaptopropyltrimethoxysilane, γ-aminopropyltriethoxysilane, N-β-(aminoethyl)-γ-aminopropyltrimethoxysilane, etc. In this case, the monofunctional surfactants are used for reducing the viscosity, and the polyfunctional surfactants are used for improving the crack resistance and the mechanical strength.

The filler may be previously treated with the above-exemplified surfactants prior to be added to the epoxy resin composition, or the surfactants may be directly added to the epoxy resin composition. It is also possible to carry out both the treatment and the addition. For improving the alkali resistance, it is preferable to treat the filler with the surfactants previously.

The amount of the surfactant added can be calculated from the formula:

$$F_S \cdot F_G / S_a$$

wherein $F_S$: specific surface area of the filler (m²/g),
$F_G$: weight of the filler (g),
$S_a$: coverage of the surfactant (m²/g).

The amount of the surfactant added is preferably 0.1 to 5 parts by weight per 100 parts by weight of the epoxy resin.

In addition, it is also possible to add flexibilizers in order to improve the crack resistance of the resin composition for insulating a coil of the present invention. As the flexibilizers, there can be used, for example, polyethylene glycols and polypropylene glycols, which have a high alkali resistance.

Ultraviolet absorbers and the like may also be added for improving the weather resistance of a cured product of the epoxy resin composition of the present invention. The addition of the ultraviolet absorbers is effective particularly in the case of a levitating coil for a linear motor car, etc. because such a coil is directly exposed to sunlight.

Pigments and coloring agents may also be added.

As a method for attaching a propelling coil for the linear motor car to a concrete panel, a method of fixing the whole coil by means of bolts, spacers, etc. or a method of embedding the coil directly in concrete is employed in order to prevent the propelling coil from being moved by electromagnetic force.

The reason why a cured product of the epoxy resin composition of the present invention has a high alkali resistance is that the acid anhydride content is limited for suppressing as much as possible the formation of an ester linkage between the acid anhydride and the epoxy resin which ester linkage is responsible for hydrolysis or dissolution.

DESCRIPTION OF THE PREFERRED EMBODIMENTS

EXAMPLES

The following examples serves to give specific illustration of the present invention but they are not intended in any way to limit the scope of the present invention. The abbreviations of polyfunctional epoxy resins, curing catalysts and surfactants used in the examples are as follows.

TABLE 1

| \multicolumn{2}{c}{Epoxy Resins and their starting materials} | |
|---|---|
| DER-332 | Diglycidyl ether of bisphenol A (epoxy equivalent: 175) |
| EP-828 | Diglycidyl ether of bisphenol A (epoxy equivalent: 185) |
| EP-807 | Diglycidyl ether of bisphenol F (epoxy equivalent: 170) |
| PY-302-2 | Diglycidyl ether of bisphenol AF (epoxy equivalent: 175) |
| DGEBAD | Diglycidyl ether of bisphenol AD (epoxy equivalent: 173) |
| TGADPM | Tetraglycidylaminodiphenylmethane |
| TTGmAP | Tetraglycidyl-m-xylylenediamine |
| TGpAP | Triglycidyl-p-aminophenol |
| TGmAP | Triglycidyl-m-aminophenol |
| CEL-2021 | 3,4-Epoxycyclohexylmethyl-(3,4-epoxy)-cyclohexanecarboxylate (epoxy equivalent: 138) |

TABLE 2

| Acid Anhydrides | |
|---|---|
| HN-5500 | Methylhexahydrophthalic anhydride (acid anhydride equivalent: 168) |
| HN-2200 | Methyltetrahydrophthalic anhydride (acid anhydride equivalent: 166) |

TABLE 3

| Curing Catalysts | |
|---|---|
| BTPP-K | Tetraphenylborate of triphenylbutylphosphine |
| 2E4MZ-K | Tetraphenylborate of 2-ethyl-4-methylimidazole |
| 2E4MZ-CN-K | Tetraphenylborate of 1-cyanoethyl-2-ethyl-4-methylimidazole |
| TEA-K | Tetraphenylborate of triethylamine |
| TPP-K | Tetraphenylborate of triphenylphosphine |
| TPP | Triphenylphosphine |
| IOZ | Salt of 2-ethyl-4-methylimidazole with zinc octanoate |
| YPH-201 | Amineimide obtained by reacting a carboxylic acid alkyl ester with a hydrazine derivative and a monoepoxy compound (mfd. by Yuka Shell Inc.) |
| CP-66 | Aliphatic sulfonium salt of a Brønsted acid (Adekaopton, mfd. by ASAHI DENKA KOGYO K.K.) |
| PX-4BT | Tetrabutylphosphonium-benzotriazolate |
| BF₃-400 | Boron trifluoride salt of piperazine |
| BF₃-100 | Boron trifluoride salt of triethylamine |
| 2E4MZ-CNS | Trimellitic acid salt of 2-ethyl-4-methylimidazole |
| 2E4MZ-OK | Isocyanuric acid salt of 2-ethyl-4-methylimidazole |
| MC-C11Z-AZINE | Microcapsules of 1-azine-2-undecyl-imidazole |
| 2E4MZ-CN | 1-Cyanoethyl-2-ethyl-4-methylimidazole |

TABLE 4

| Surfactants | |
|---|---|
| KBM-403 | γ-Glycidoxypropyltrimethoxysilane |
| KBM-303 | β-(3,4-Epoxycyclohexyl)ethyltrimethoxysilane |
| KBM-803 | γ-Mercaptopropyltrimethoxysilane |
| KBM-903 | γ-Aminopropyltriethoxysilane |
| KBM-603 | N-β-(aminoethyl)-γ-aminopropyltrimethoxysilane |
| S-181 | Isopropyl isostearoyltitanate |
| KR-2S | Isopropyl trioctanoyltitanate |
| AL-M | Ethyl acetoacetate aluminum diisopropylate |

TABLE 4-continued

| Surfactants | |
| --- | --- |
| AL-T | Aluminum tris(ethyl acetoacetate) |

[Alkali concentration of water contained in concrete]

Concrete was prepared by thoroughly mixing 450 kg/m$^3$ of ordinary portland cement having a total alkali content of 0 65% 180 kg/m$^3$ of water, 800 kg/m$^3$ of mountain sand 1,000 kg/m$^3$ of crushed stone and 5.7 kg/m$^3$ of additives.

Usually, the water content in concrete is about 8% by weight (water/cement=0.4) at the time of preparation and decreases with the progress of setting, but water exists in the concrete in an amount of about 3% by weight (water/cement=0.15) even after setting. The alkali concentration of water contained in the concrete prepared was measured after setting.

Table 5 shows the results obtained.

The alkali concentration was measured by grinding the concrete and extracting the same with a predetermined amount of water.

As can be seen from Table 5, the alkali concentration of water contained in the pores of the concrete was 0.55 mole/liter 3 days after setting of the concrete and about 0.5 mole/liter 900 days after the setting. It is said that the alkali concentration of water contained in the pores of concrete is substantially constant even after 5 years or 10 years.

When a high-tension coil molded out of a casting epoxy resin composition (hereinafter referred to as casting resin) for insulating a coil is embedded in concrete or fixed on a concrete surface by means of bolts or specially made spacers, strongly alkaline water contained in the pores of the concrete deteriorates the cured resin of the molded coil. In the examples, such circumstances of the coil were simulated by producing curing test pieces of a casting resin and immersing the same in an aqueous NaOH solution having a predetermined temperature and a predetermined concentration. The change of the flexural strength of the test pieces with the immersion time was measured, whereby the lifetime was estimated.

TABLE 5

| Number of days elapsed (days) | Concentration (mole/liter) | | |
| --- | --- | --- | --- |
| | Sodium cation | Potassium cation | Hydroxide anion |
| 1 | 0.13 | 0.32 | 0.43 |
| 3 | 0.23 | 0.39 | 0.55 |
| 7 | 0.25 | 0.40 | 0.54 |
| 30 | 0.25 | 0.40 | 0.54 |
| 90 | 0.20 | 0.40 | 0.50 |
| 300 | 0.20 | 0.40 | 0.50 |
| 900 | 0.20 | 0.40 | 0.49 |

[Example of synthesis of polyfunctional epoxy resin A]

Into a reactor equipped with a thermometer, stirrer, dropping funnel and reaction-water-recovering device were charged 100 g of bis(4-hydroxyphenyl)methane, 4 g of bis(4-hydroxyphenyl)propane and 925 g of epichlorohydrin, and 175 g of a 48 wt % aqueous sodium hydroxide solution was added dropwise with heating and stirring over a period of 2 hours. During the reaction, water and epichlorohydrin were distilled from the reaction mixture. The epichlorohydrin alone was returned to the reactor to adjust the water content of the reaction mixture to 5% by weight or less.

After completion of the dropwise addition of the aqueous sodium hydroxide solution, the heating was continued for another 15 minutes to remove the water substantially completely. Then, the unreacted epichlorohydrin was distilled off.

For facilitating the separation of NaCl from the crude product thus obtained, the crude product was dissolved in about 55 g of toluene, and NaCl was removed by filtration.

Subsequently, the pressure was reduced to 2 mmHg while heating the residue at 170° C., whereby toluene was completely removed. Thus, light-yellow polyfunctional epoxy resin A was obtained. This epoxy resin A had an epoxy equivalent of 173 and a hydrolyzable-chlorine content of 100 ppm.

EXAMPLES 1 TO 35

In accordance with each recipe shown in Tables 6 to 11, the polyfunctional epoxy resins(s), filler and surfactant(s) listed therein were thoroughly stirred and mixed the curing catalyst listed in each recipe was added, followed by thorough mixing, whereby casting resins (casting epoxy resin compositions) for insulating a coil were obtained. Tables 6 to 11 show the viscosity of the casting resins at 100° C., their pot life at 100° C., and the dielectric breakdown voltage of cured products of the casting resins.

Each casting resin was heated at 150° C. for 3 hours and then at 180° C. for 10 hours to obtain a brown, transparent cured product.

Flexural test pieces were prepared by cutting off the cured product to dimensions of 5 mm × 12.6 mm × 100 mm. They were immersed in an aqueous alkali solution having a predetermined temperature and a concentration of 0.5 mole/liter. Some of the test pieces were taken out at regular intervals, and their flexural properties at room temperature (20° C.) were measured.

The time required for the flexural strength to be reduced by one half was referred to as lifetime, and the life expectancy was determined on the basis of Arrhenius plot, i.e., a graph obtained by plotting the lifetime against the reciprocal of absolute temperature. FIGS. 1 to 9 show the results obtained.

As can be seen from FIGS. 1 to 9, all of the life expectancies of the casting resins for insulating a coil of the present examples are 15 years or more in the aqueous alkali solution with a concentration of 0.5 mole/liter at room temperature (20° C.).

TABLE 6

| | Example (parts by weight) | | | | | |
| --- | --- | --- | --- | --- | --- | --- |
| | 1 | 2 | 3 | 4 | 5 | 6 |
| Polyfunctional epoxy resin | DER-332 (100) | A of Example of synthesis (100) | EP-807 (100) | PY-302-2 (100) | EP-828 (100) | EP-828 (80) DGEBAD (20) |
| Filler | Alumina | same as left | same as left | same as left | same as left | same as left |

TABLE 6-continued

| | Example (parts by weight) | | | | | |
|---|---|---|---|---|---|---|
| | 1 | 2 | 3 | 4 | 5 | 6 |
| Surfactant | (345) KBM-403 (1.5) S-181 (1.0) | same as left | same as left | same as left | same as left | same as left |
| Curing catalyst | 2E4MZ-K (5.0) | TEA-K (5.0) | 2E4MZ-CN-K (5.0) | YPH-201 (5.0) | TPP-K (5.0) | CP-66 (5.0) |
| Viscosity (poise at 100° C.) | 7 | 4 | 5 | 6 | 8 | 5 |
| Pot life (hr at 100° C.) | 4 | 4 | 4 | 4 | 4 | 4 |
| Dielectric breakdown voltage (kV/mm) | 51 | 52 | 51 | 53 | 50 | 52 |

Alumina: purity of 99.9% or more, average particle size of 4.6 μm, and $Na_2O$ content of 0.07%.

TABLE 7

| | Example (parts by weight) | | | | | |
|---|---|---|---|---|---|---|
| | 7 | 8 | 9 | 10 | 11 | 12 |
| Polyfunctional epoxy resin | EP-828 (80) TGADPM (20) | EP-828 (80) TTGmAP (20) | EP-828 (80) TGpAP (20) | EP-828 (80) TGmAP (20) | PY-302-2 (50) CEL-2021 (50) | A of Example of synthesis (100) |
| Filler | Alumina (345) | same as left | same as left | same as left | same as left | same as left |
| Surfactant | KBM-403 (1.5) S-181 (1.0) | same as left | same as left | same as left | same as left | same as left left |
| Curing catalyst | PX-4BT (5.0) | BTPP-K (5.0) | IOZ (3.0) | $BF_3$-400 (3.0) | CP-66 (3.0) | 2E4MZ-CNS (3.0) |
| Viscosity (poise at 100° C.) | 5 | 4 | 4 | 4 | 2 | 4 |
| Pot life (hr at 100° C.) | 4 | 4 | 4 | 4 | 6 | 3 |
| Dielectric breakdown voltage (kV/mm) | 50 | 50 | 53 | 51 | 53 | 53 |

Alumina: purity of 99.9% or more, average particle size of 4.6 μm, and $Na_2O$ content of 0.07%.

TABLE 8

| | Example (parts by weight) | | | | | |
|---|---|---|---|---|---|---|
| | 13 | 14 | 15 | 16 | 17 | 18 |
| Polyfunctional epoxy resin | A of Example of synthesis (100) | same as left | same as left | same as left | same as left | same as left |
| Filler | Alumina (345) | same as left | same as left | same as left | same as left | same as left |
| Surfactant | KBM-403 (1.5) S-181 (1.0) | same as left | same as left | KBM-403 (2.0) | KBM-803 (2.0) | KBM-303 (2.0) |
| Curing catalyst | 2E4MZ-OK (3.0) | MC-C11Z-AZINE(7.0) | YPH-201 (4.0) | same as left | same as left | same as left |
| Viscosity (poise at 100° C.) | 4 | 4 | 4 | 7 | 8 | 10 |
| Pot life (hr at 100° C.) | 3 | 5 | 4 | 4 | 3 | 4 |
| Dielectric breakdown voltate (kV/mm) | 52 | 53 | 53 | 52 | 51 | 53 |

Alumina: purity of 99.9% or more, average particle size of 4.6 μm, and $Na_2O$ content of 0.07%.

TABLE 9

| | Example (parts by weight) | | | | | |
|---|---|---|---|---|---|---|
| | 19 | 20 | 21 | 22 | 23 | 24 |
| Polyfunctional epoxy resin | A of Example of synthesis (100) | same as left | same as left | same as left | same as left | same as left |
| Filler | Alumina (345) | same as left | same as left | same as left | same as left | same as left |
| Surfactant | KBM-403 (2.0) | KBM-903 (2.0) | KBM-903 (1.5) S-181 (1.0) | S-181 (2.0) | KR-2S (2.0) | KBM-803 (2.0) KR-2S (1.5) |

TABLE 9-continued

| | Example (parts by weight) | | | | | |
|---|---|---|---|---|---|---|
| | 19 | 20 | 21 | 22 | 23 | 24 |
| Curing catalyst | YPH-201 (4.0) | same as left | same as left | same as left | same as left | same as left |
| Viscosity (poise at 100° C.) | 10 | 10 | 4 | 3 | 3 | 4 |
| Pot life (hr at 100° C.) | 3 | 3 | 4 | 4 | 4 | 4 |
| Dielectric breakdown voltage (kV/mm) | 50 | 52 | 55 | 54 | 53 | 54 |

Alumina: purity of 99.9% or more, average particle size of 4.6 μm, and $Na_2O$ content of 0.07%.

TABLE 10

| | Example (parts by weight) | | | | | |
|---|---|---|---|---|---|---|
| | 25 | 26 | 27 | 28 | 29 | 30 |
| Polyfunctional epoxy resin | A of Example of synthesis (100) | same as left | A of Example of synthesis (hydrolyzable chlorine: 1000 ppm) (100) | A of Example of synthesis (hydrolyzable chlorine: 2000 ppm) (100) | A of Example of synthesis (100) | same as left* |
| Filler | Alumina (345) | same as left | same as left | same as left | Alumina (345) | Alumina (410) |
| Surfactant | AL-M (2.0) | AL-T (2.0) | KBM-403 (1.5) S-181 (1.0) | same as left | same as left | same as left |
| Curing catalyst | YPH-201 (4.0) | same as left | same as left | same as left | same as left | same as left |
| Viscosity (poise at 100° C.) | 7 | 8 | 4 | 4 | 4 | 10 |
| Pot life (hr at 100° C.) | 4 | 4 | 6 | 8 | 4 | 5 |
| Dielectric breakdown voltage (kV/mm) | 55 | 53 | 52 | 55 | 53 | 52 |

Alumina: purity of 99.9% or more, average particle size of 4.6 μm, and $Na_2O$ content of 0.07%.
*: 5 Parts by weight of a polyethylene-type flexibilizer was added.

TABLE 11

| | Example (parts by weight) | | | | |
|---|---|---|---|---|---|
| | 31 | 32 | 33 | 34** | 35*** |
| Polyfunctional epoxy resin | A of Example of synthesis (100) | same as left | same as left | same as left | same as left |
| Filler | Alumina (275) | Alumina (345) | Alumina (300) | Alumina (345) | Alumina (345) |
| Average particle size (μm) | 4.6 | 3.0 | 5.0 | 30.0 | 3.0 |
| $Na_2O$ content (%) | 0.07 | 0.07 | 0.35 | 0.09 | 0.07 |
| Surfactant | KBM-403 (1.5) S-181 (1.0) | same as left | same as left | same as left | same as left |
| Curing catalyst | YPH-201 (3.0) | YPH-201 (3.0) | YPH-201 (3.0) | 2E4MZ-CNS (4.0) | 2E4MZ-CNS (3.0) |
| Viscosity (poise at 100° C.) | 1 | 5 | 5 | 1 | 3 |
| Pot life (hr at 100° C.) | 6 | 6 | 5 | 0.3 | 5 |
| Dielectric breakdown voltage (kV/mm) | 51 | 53 | 50 | 52 | 52 |

Alumina purity: 99.9% or more.
**: Partial precipitation occurred.
***: Alumina was directly treated with KBM-403 in an amount of 1.5%.

Comparative Example 1

175 Grams of DER-332, 168 g of an acid anhydride HN-5500, 1,100 g of crystalline silica (average particle size: 5.5 μm) and 3 g of a surfactant KBM-403 were thoroughly stirred and mixed. Then, the mixture was maintained at about 85° C. and 0.15 g of an imidazole type curing catalyst 2E4MZ-CN was added. The resulting mixture was heated at 100° C. for 15 hours and then at 180° C. for 10 hours to obtain a cured product.

Figure 10:
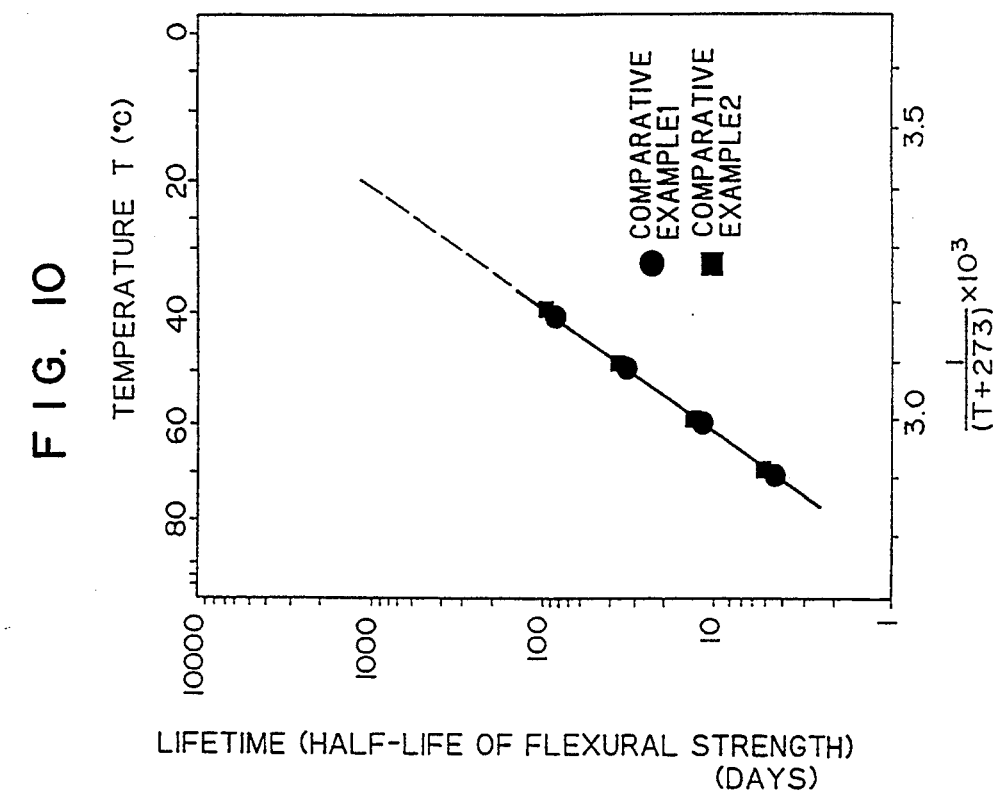
Figure 9:
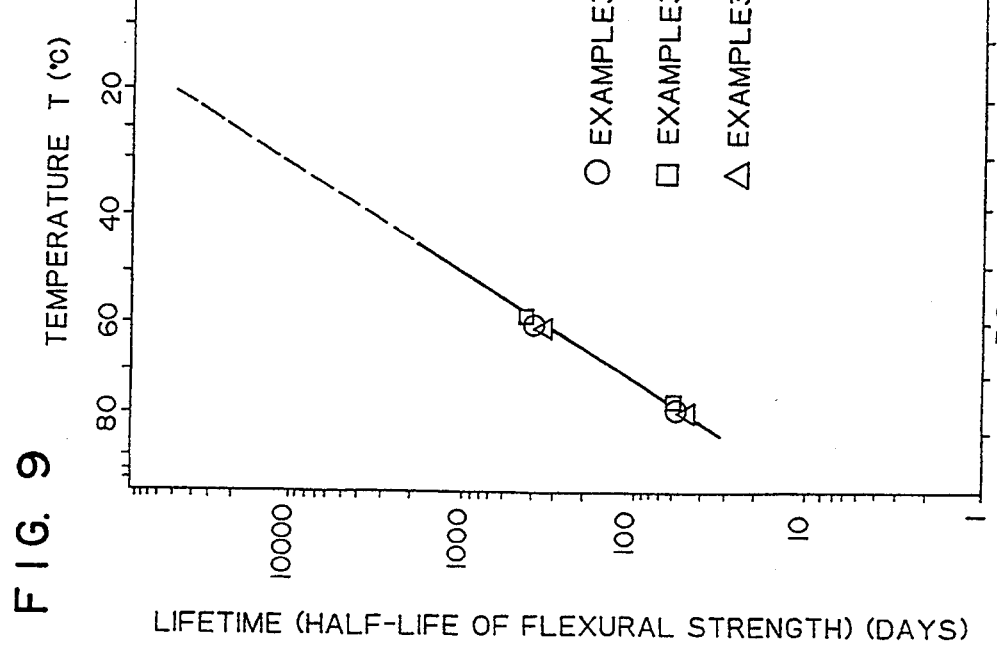
Figure 12:
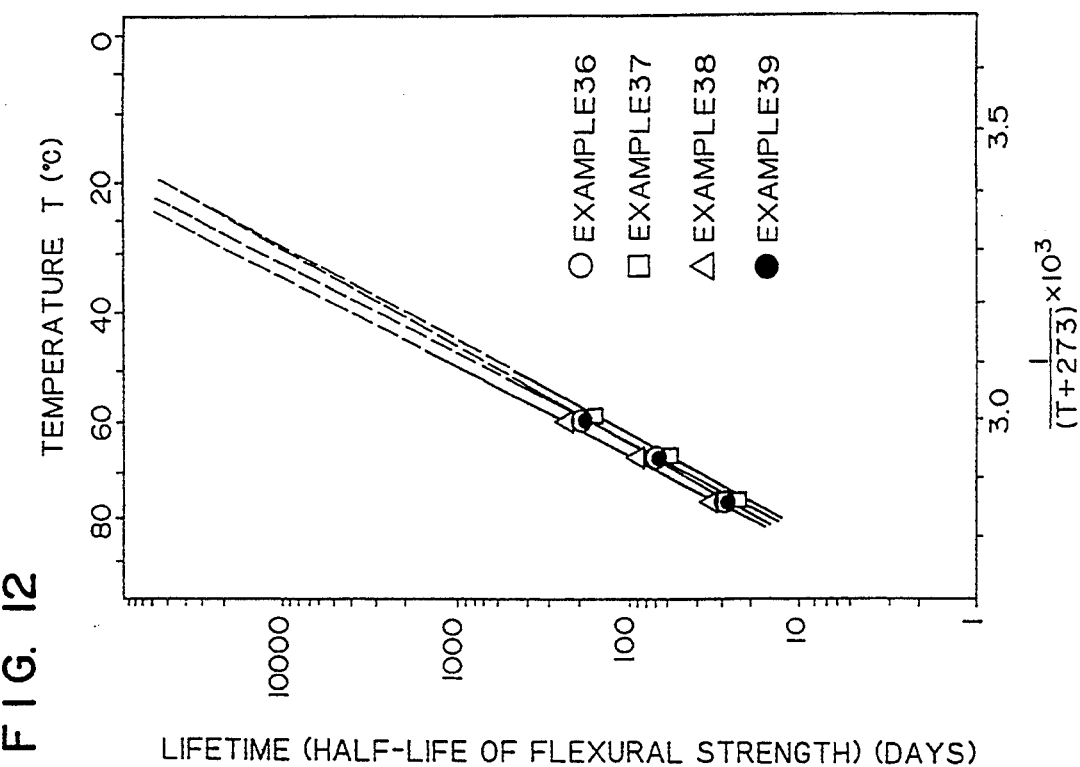

In the same manner as in Example 1, the flexural properties of the cured product were measured and the lifetime was determined. FIG. 10 shows the results.

Comparative Example 2

185 g of EP-828, 168 g of HN-2200, 20 g of polyethylene glycol and 1,200 g of alumina (average particle size:

5.5 μm) and 3 g of KBM-403 were thoroughly stirred and mixed. Then, the mixture was maintained at about 85° C. and 0.15 g of 2E4MZ-CN was added. The resulting mixture was heated at 100° C. for 15 hours and then at 180° C. for 10 hours to obtain a cured product.

In the same manner as in Example 1, the flexural properties of the cured product were measured and the lifetime was determined. FIG. 10 shows the results.

As can be seen in FIG. 10, the life expectancies of the acid-anhydride-setting epoxy resins of Comparative Examples 1 and 2 in an aqueous alkali solution with a concentration of 0.5 mole/liter at room temperature are less than 3 years (1,000 days).

Comparative Example 3

Figure 11:
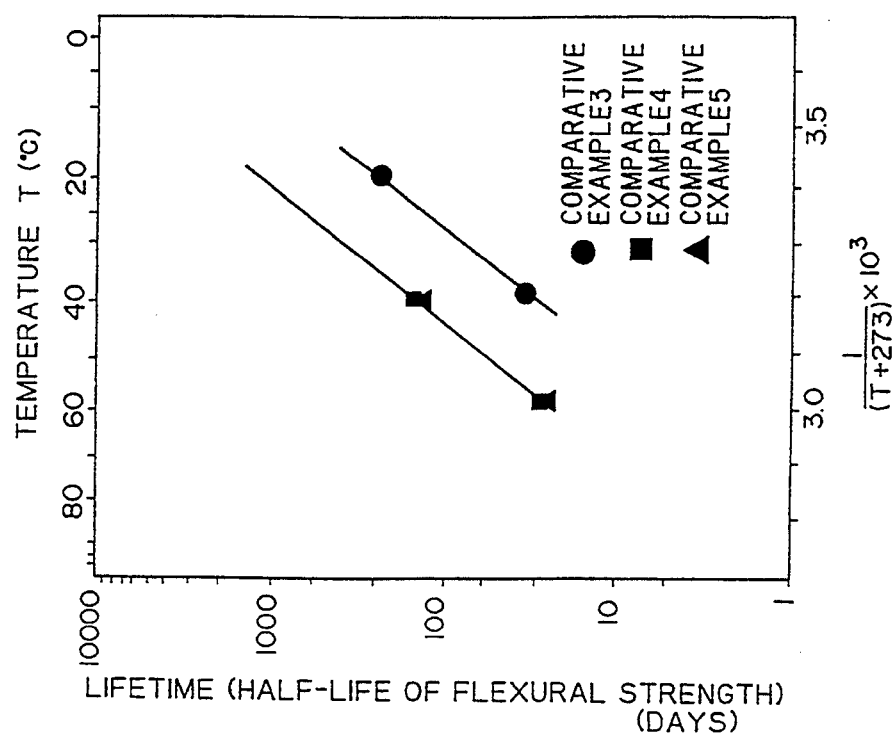
Figure 14:
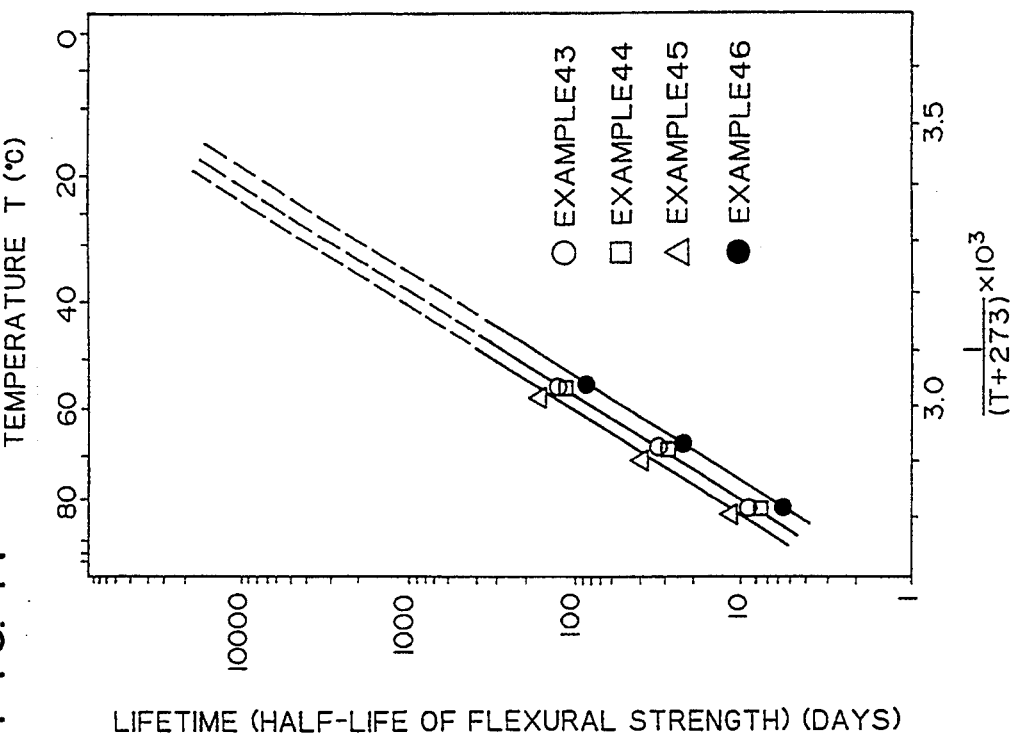
Figure 13:
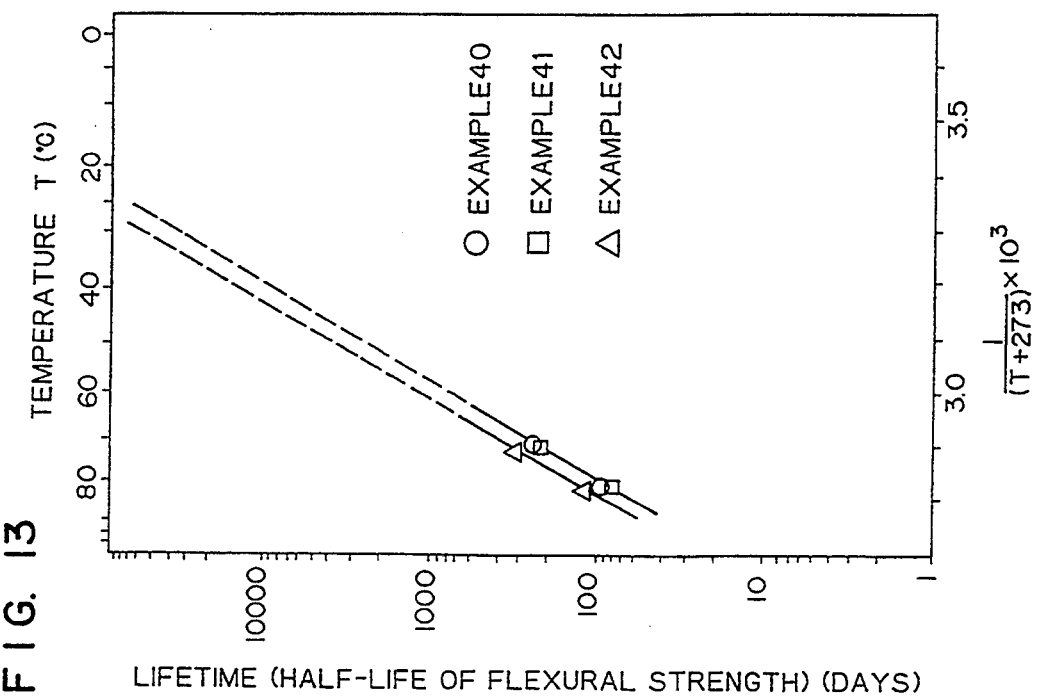
Figure 15:
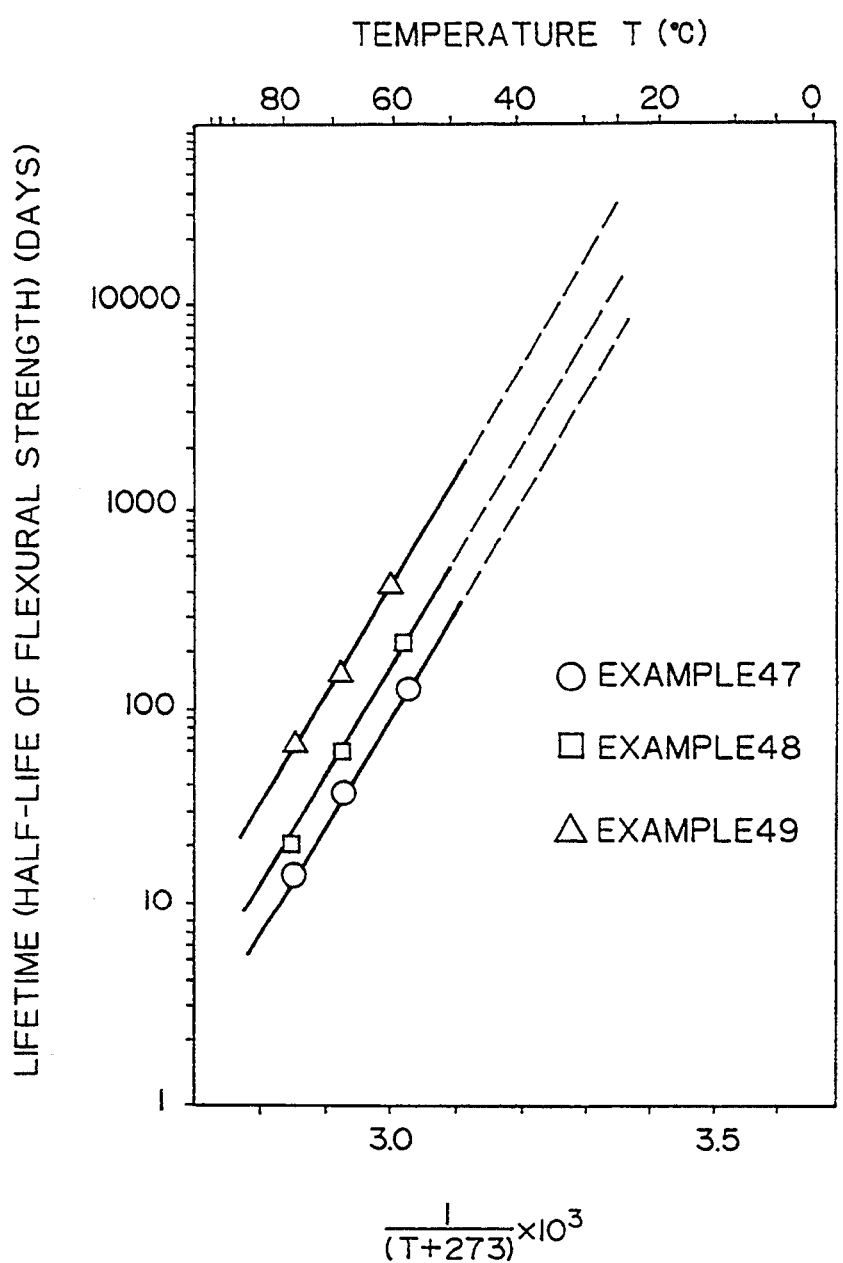

The same flexural test pieces as used in Comparative Example 1 were fitted in grooves of a block of concrete having the characteristics shown in Table 5, and allowed to stand in a thermostatic chamber at a predetermined temperature. Some of the test pieces were taken out of the thermostatic chamber at regular intervals, and their flexural properties at room temperature were measured. The lifetime was determined in the same manner as described above. FIG. 11 shows the results.

As can be seen in FIG. 11, the life expectancy of the acid-anhydride-setting epoxy resin at room temperature is less than 1 year (300 days).

Comparative Examples 4 and 5

The same flexural test pieces as used in Comparative Example 1 were attached to a panel of concrete having the characteristics shown in Table 5 by means of bolts to be brought into direct contact with the concrete, and the panel was allowed to stand in a thermostatic chamber at a predetermined temperature. Some of the test pieces were taken out at regular intervals and their flexural properties at room temperature were measured. The lifetime was determined in the same manner as described above. FIG. 11 shows the results.

As can be seen in FIG. 11, the life expectancies of the acid-anhydride-setting epoxy resins of Comparative Examples 4 and 5 at room temperature are less than 3 years (1,000 days).

EXAMPLES 36 TO 49

In accordance with each recipe shown in Tables 12 and 13, the polyfunctional epoxy resin, filler(s) and surfactants listed therein were mixed. The curing catalyst listed in each recipe was added, followed by thorough mixing, whereby casting resins for insulating a coil were obtained. Tables 12 and 13 show the viscosity and pot life of the casting resins at 100° C. and the dielectric breakdown voltage of cured products of the casting resins. Each casting resin was cured at 150° C. for 3 hours and then at 180° C. for 10 hours. Then, the same test pieces as described above were prepared from the cured product thus obtained, and they were brought into contact with concrete having the characteristics shown in Table 5 and heated for predetermined times. Thereafter, their flexural properties were measured, and the lifetime was determined in the same manner as described above. FIGS. 12 to 15 show the results.

As can be seen in FIGS. 12 to 15, all of the life expectancies of the casting resins in contact with the concrete at room temperature are more than 15 years.

TABLE 12

| | Example (parts by weight) | | | | | | |
|---|---|---|---|---|---|---|---|
| | 36 | 37 | 38 | 39 | 40 | 41 | 42 |
| Polyfunctional epoxy resin | A of Example of synthesis (100) | same as left | same as left | same as left | PY-302-2 (100) | A of Example of synthesis (100) | same as left |
| Filler | Alumina (345) | Alumina (345) | Alumina (300) | Alumina (345) | Alumina (345) | Alumina (345) | Alumina (300) |
| Average particle size (μm) | 4.6 | 5.0 | 5.0 | 4.6 | 4.6 | 4.6 | 4.6 |
| Na$_2$O content (%) | 0.07 | 0.35 | 0.35 | 0.07 | 0.07 | 0.07 | 0.07 |
| Surfactant | KBM-403 (1.5) S-181 (1.0) | same as left | same as left | same as left | same as left | KBM-403 (1.5) S-181 (1.0) | same as left |
| Curing catalyst | YHP-201 (5.0) | same as left | same as left | MC-C11Z-AZINE (8.0) | YPH-2 (5.0) | YPH-2 (5.0) | same as left |
| Viscosity (poise at 100° C.) | 4 | 7 | 2 | 4 | 4 | 4 | 2 |
| Pot life (hr at 100° C.) | 4 | 4 | 4 | 4 | 4 | 4 | 4 |
| Linear expansion coefficient (/°C.) | $2.3 \times 10^{-5}$ | $2.3 \times 10^{-5}$ | $2.5 \times 10^{-5}$ | $2.3 \times 10^{-5}$ | $2.3 \times 10^{-5}$ | $2.3 \times 10^{-5}$ | $2.5 \times 10^{-5}$ |
| Dielectric breakdown voltage (kV/mm) | 53 | 52 | 56 | 53 | 54 | 53 | 56 |
| Method for attachment to concrete | Embedding | Embedding | Embedding | Embedding | Contact | Contact | Contact |

TABLE 13

| | Example (parts by weight) | | | | | | |
|---|---|---|---|---|---|---|---|
| | 43 | 44 | 45 | 46 | 47 | 48 | 49 |
| Polyfunctional epoxy resin | A of Example of synthesis (100) | same as left | same as left | A of Example of synthesis (100) | PY-302-2 (100) | A of Example of synthesis (100) | same as left |
| Filler | Crystalline silica (360) | Molten silica (360) | Crystalline silica (180) Alumina (170) | Crystalline silica (180) Hydrated alumina | Crystalline silica (345) | Alumina (300) Glass chop (15) | Alumina (200) PP chop (10) |

TABLE 13-continued

| | Example (parts by weight) | | | | | | |
|---|---|---|---|---|---|---|---|
| | 43 | 44 | 45 | 46 | 47 | 48 | 49 |
| | | | | (200) | | | |
| Average particle size (μm) | 3.5 | 15.0 | | | | | |
| Na₂O content (%) | 0 | 0 | | | | | |
| Surfactant | KBM-403 (1.5) S-181 (1.0) | same as left | same as left | KBM-403 (1.5) S-181 (1.0) | same as left | same as left | same as left |
| Curing catalyst | YHP-201 (5.0) | same as left | same as left | MC-C11Z-AZINE (8.0) | YPH-201 (5.0) | same as left | same as left |
| Viscosity (poise at 100° C.) | 1 | 2 | 2 | 15 | 2 | 5 | 5 |
| Pot life (hr at 100° C.) | 4 | 4 | 4 | 3 | 4 | 4 | 4 |
| Linear expansion coefficient (/°C.) | $2.3 \times 10^{-5}$ | $2.3 \times 10^{-5}$ | $2.3 \times 10^{-5}$ | $2.5 \times 10^{-5}$ | $2.3 \times 10^{-5}$ | $2.5 \times 10^{-5}$ | $2.5 \times 10^{-5}$ |
| Dielectric breakdown voltage (kV/mm) | 53 | 52 | 51 | 53 | 50 | 52 | 50 |
| Method for attachment to concrete | Directly | Directly | Directly | Directly | Directly | Directly | Directly |

EXAMPLES 50 TO 56

Figure 16A:
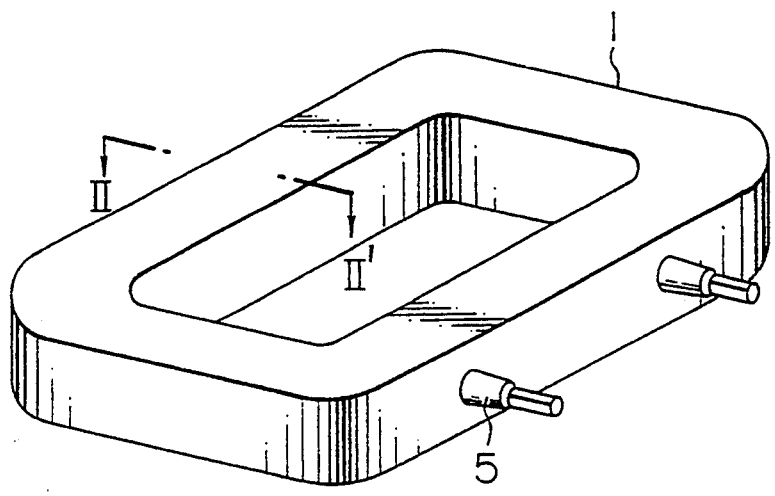
FIG. 16A is a perspective view of a ground propelling coil for linear motor car.
Figure 16B:
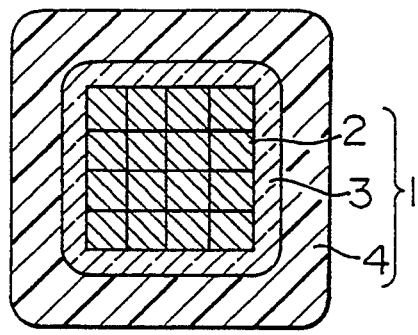
FIG. 16B is an enlarged sectional view taken along the line II—II' of FIG. 16A.

As shown in FIG. 16, a glass-lined prepreg mica tape 3 was wound round an Al conductor 2 and heat-cured under pressure. The casting resin 4 of each of Examples 35, 37, 38, 43, 44, 47 and 49 was molded so as to envelop the conductor 2 wound with the heat-cured tape 3. Thereafter, the casting resin 4 was heat-cured at 150° C. for 3 hours and then at 180° C. for 10 hours, whereby ground propelling coils for linear motor car were obtained.

The epoxy resin compositions for insulating a coil used in the present examples had an excellent workability before curing due to their low viscosity. The ground propelling coils for linear motor car thus produced did not have a void and had excellent electrical and mechanical properties, heat resistance and crack resistance.

EXAMPLE 57

FIG. 17 shows a concrete panel of a coil for linear motor car which is produced by embedding directly in concrete 11 a coil 12 produced in the same manner as in Example 50 wherein the casting resin of Example 36 was molded.

FIG. 17A is a partially sectional front view of the panel, and FIG. 17B is a sectional view taken along the line A—A' of FIG. 17A.

The panel has one to several propelling coils 12 embedded in the concrete and a levitation guide coil 13 attached to the concrete by means of bolts (not shown). As the levitation guide coil, there is used one which is produced by resin molding or a sheet mold compound (SMC) method.

Figure 21:
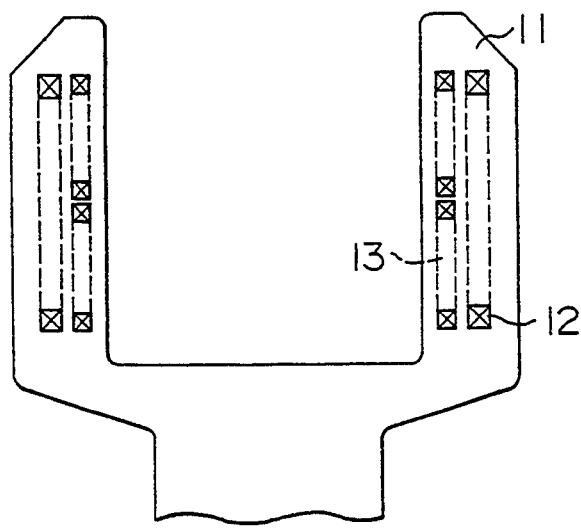
FIG. 21 is a sectional schematic view of a track for linear motor car.

As shown in FIG. 21, i.e., the schematic view of a track for linear motor car, the concrete panels are set up face to face with each other. The body of a car is placed between them.

EXAMPLE 58

Figure 18A:
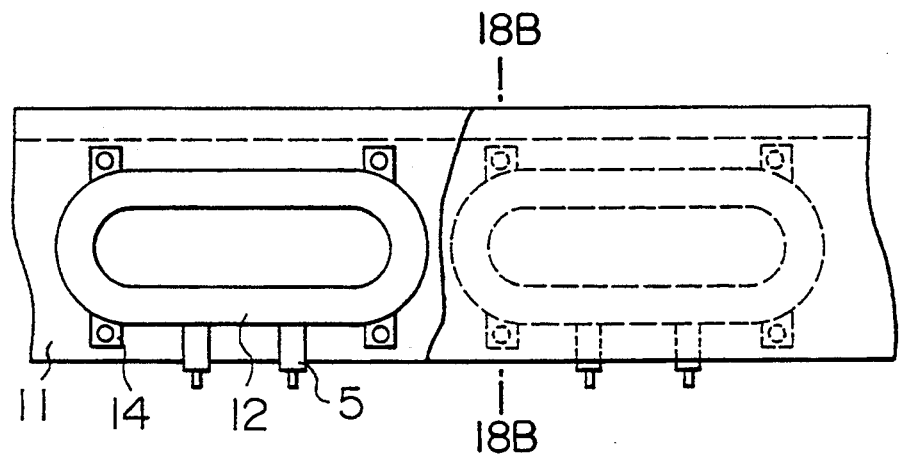
Figure 18B:
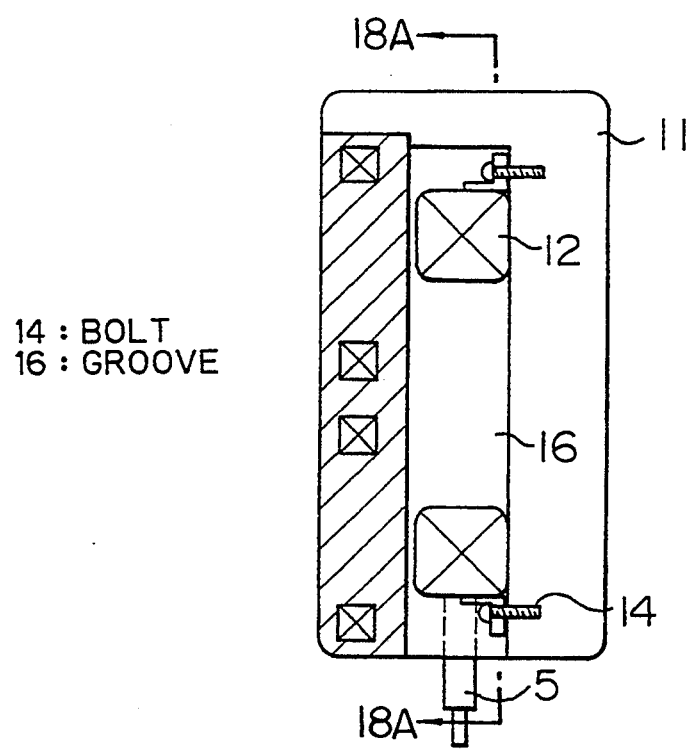

FIG. 18 shows another example of a concrete panel of a coil for linear motor car.

One or more molded propelling coils 12 are fixed directly in the groove 16 of concrete 11 by means of bolts 14.

EXAMPLE 59

Figure 19A:
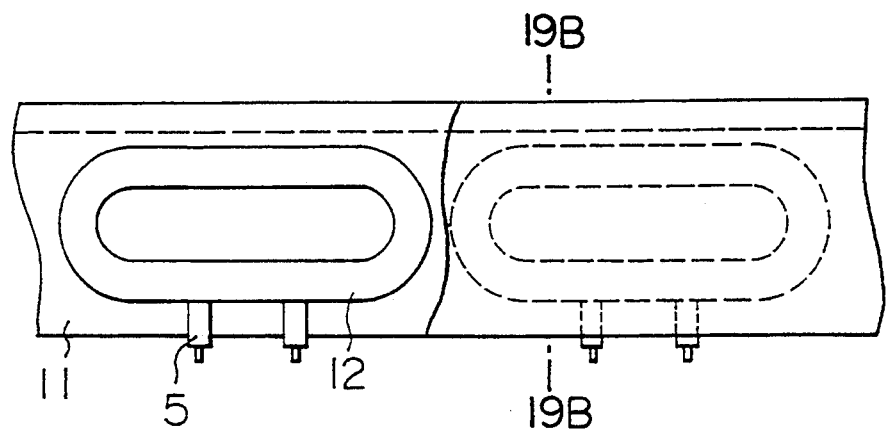
Figure 19B:
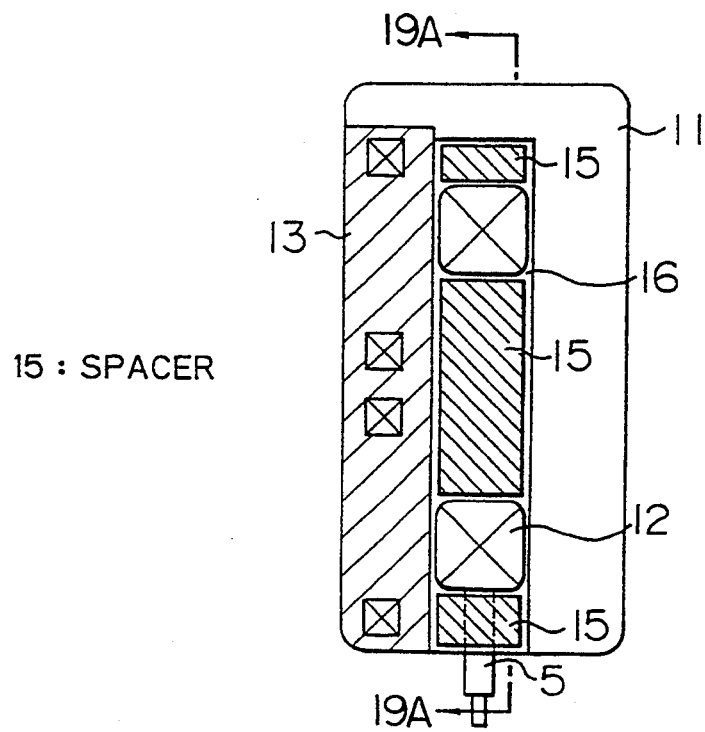

FIG. 19 shows further another example of a concrete panel of a coil for linear motor car.

One or more molded propelling coils 12 are held by spacers 15 for fixing the coil, and the spacers are attached to concrete 11 by means of bolts (not shown).

EXAMPLE 60

Figure 20A:
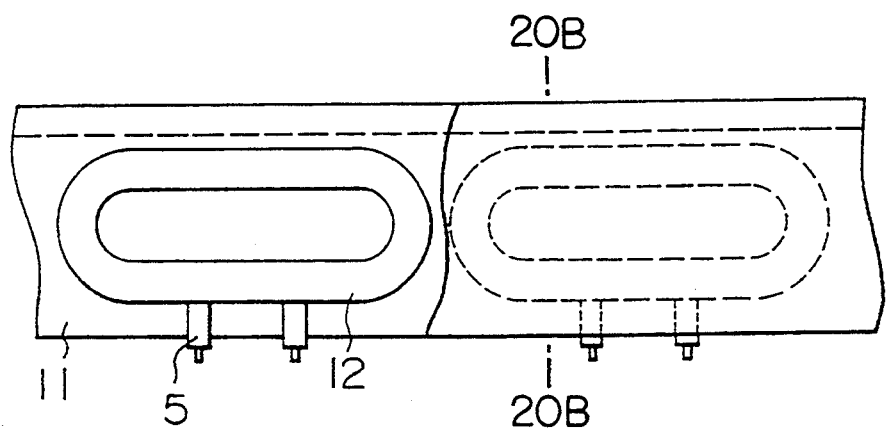
Figure 20B:
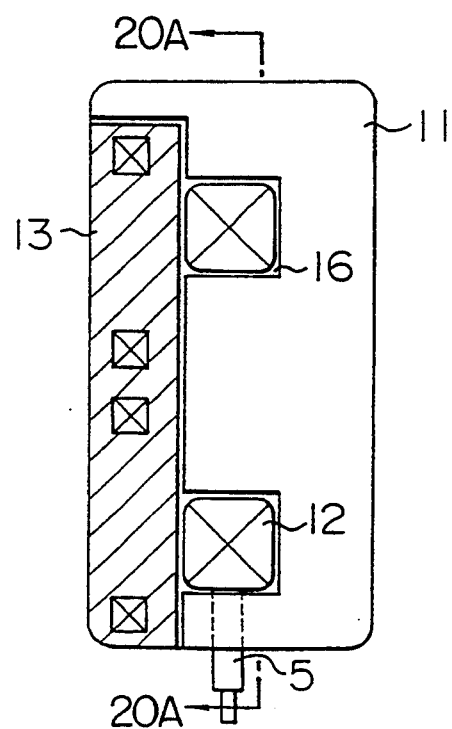

FIG. 20 shows still another example of a concrete panel of a coil for linear motor car.

One or more propelling coils 12 are held in a groove 16 formed in concrete 11, and fixed by means of a levitation guide coil panel.

EXAMPLE 61

Figure 22A:
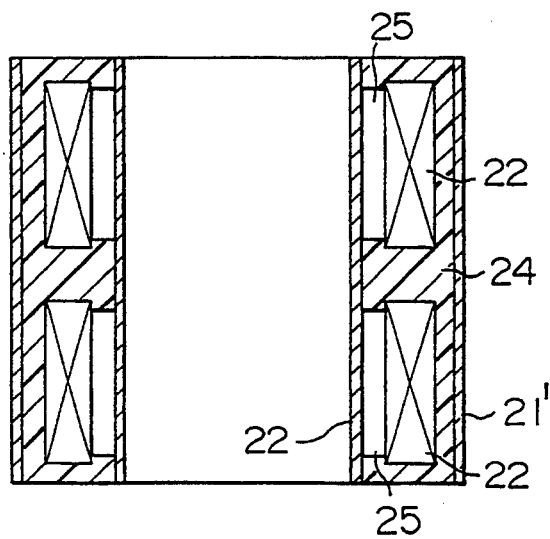
FIG. 22A is a vertical cross-sectional view of a coil for transformer.
Figure 22B:
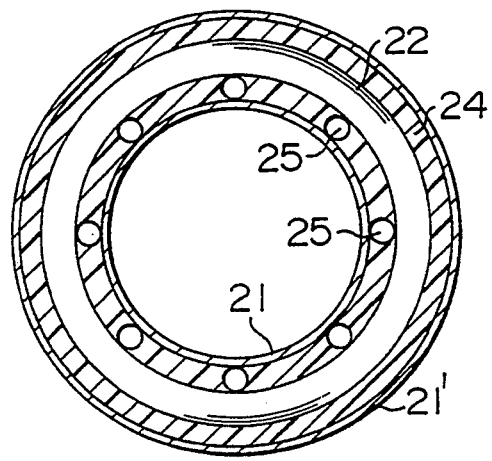
FIG. 22B is a transverse cross-sectional view of the coil for transformer.

As shown in FIG. 22, a coiled Al conductor 22 was placed between molds 21 and 21', and the casting resin of each of Examples 35, 37, 38, 43, 44, 47 and 49 was molded so as to envelop the conductor 22.

Subsequently, the casting resin was heat-cured at 150° C. for 3 hours and then at 180° C. for 10 hours, whereby coils for transformer were obtained. The casting resins of these examples had an excellent workability before curing due to their low viscosity. The coils produced did not have a void and had excellent electrical and mechanical properties.

EXAMPLES 62 TO 64

Comparative Examples 6 and 7

For investigating the influence of an acid anhydride on the alkali resistance of resin compositions, epoxy resin compositions were prepared by blending the acid anhydride in various amounts, and compared in alkali resistances. Table 14 shows recipes for the epoxy resin compositions.

Test pieces of cured products of the epoxy resin compositions prepared according to the recipes shown in Table 14 were compared in alkali resistance in terms of the number of days required for the flexural strength to be reduced by one half in the case where the test pieces were held in an aqueous NaOH solution having a temperature of 60° C. and a concentration of 0.5 mole/liter.

The flexural strength was measured in the same manner as in Example 1.

As is clear from the results shown in Table 14, when the amount of the acid anhydride is 10 parts by weight or less per 100 parts by weight of the epoxy resin, the alkali resistance is high. In particular, the flexural strength of a cured product of Example 62 containing no acid anhydride is not changed even after 300 days or more, indicating that the flexural strength is very high.

of the flexural strength of a heat-cured product obtained by heating the composition at 180° C. is 100 days or more when the heat-cured product is immersed in an alkali solution having a temperature of 60° C. and a pH of 13 said resin composition exhibiting a viscosity of 10 poise or less at 100° C. and being substantially free from acid anhydride.

5. A molded coil for use in contact with concrete

TABLE 14

| | (parts by weight) | | | | |
|---|---|---|---|---|---|
| | Example | | | Comparative Example | |
| | 62 | 63 | 64 | 6 | 7 |
| Polyfunctional epoxy resin | EP-828 (100) | same as left | same as left | same as left | same as left |
| Acid anhydride | HN-2200 (0) | HN-2200 (5) | HN-2200 (10) | HN-2200 (20) | HN-2200 (90.8) |
| Filler | Alumina (purity: 72.9%) (345) | Alumina (purity: 72.9%) (358) | Alumina (purity: 72.9%) (371) | Alumina (purity: 72.9%) (398) | Alumina (purity: 72.9%) (561) |
| Surfactant | KBM-403 (3.0) | same as left | same.as | same as left | same as left |
| Curing catalyst | 2E4MZ-CN (5.0) | same as left | same as left | same as left | same as left |
| Flexibilizer | PEG | same as left | same as left | same as left | same as left |
| Half-life of flexural strength (days) | 300 or more | 200 | 105 | 20 | 15 |

What is claimed is:

1. A molded coil for use in contact with concrete comprising an electric conductor, an insulating layer would around the electric conductor, and a cured resin molded integrally with the electric conductor and the insulating layer, said cured resin being a cured product of a resin composition which comprises at least one polyfunctional epoxy resin, at least one latent curing catalyst, at least one alkali-resistant filler and at least one surfactant, wherein the composition is substantially free from acid anhydride and the viscosity of the composition is 10 poise or less at 100° C. wherein the cured resin exhibits high alkali resistance in contact with concrete.

2. A molded coil according to claim 1, wherein said resin composition comprises 100 parts by weight of the at least one polyfunctional epoxy resin, 0.1 to 10 parts by weight of the at least one latent curing catalyst and 0.1 to 5 parts by weight of the at least one surfactant and contains the at least one filler in an amount of 45 to 65% by volume based on the volume of the whole composition.

3. A molded coil according to claim 2, wherein the latent curing catalyst is selected from a group consisting of quaternary ammonium salts, amine metal salts, imidazole derivative metal salts, amine tetraphenylborates, complex salts of boron trifluoride and an amine or imidazole, aliphatic sulfonium salts, amineimides, and microcapsules thereof.

4. A molded coil for use in contact with concrete comprising an electric conductor, an insulating layer wound around the electric conductor, and a cured resin molded integrally with the electric conductor and the insulating layer, said cured resin being a cured product of an epoxy resin composition consisting essentially of a resin component consisting of at least one polyfunctional epoxy resin, at least one latent curing catalyst, at least one alkali-resistant filler and at least one surfactant, which composition is such that the half-life comprising an electric conductor in the shape of a coil, an insulating layer wound around the electric conductor, and a cured resin molded integrally with the electric conductor and the insulating layer, said cured resin being a cured product of a resin composition which consists essentially of at least one polyfunctional epoxy resin as the sole resin in said composition, at least one latent curing catalyst for said at least one polyfunctional epoxy resin, at least one alkali-resistant filler and at least one surfactant, wherein the composition is substantially free from acid anhydride and exhibits a viscosity of 10 poise or less at 100° C. whereby the cured resin exhibits high alkali resistance in contact with concrete.

6. A molded coil for use in contact with concrete comprising an electric conductor in the form of a coil, an insulating layer wound around the electric conductor, and a cured resin molded integrally with the electric conductor and the insulating layer, said cured resin being a cured product of a resin composition which consists essentially of at least one polyfunctional epoxy resin, at least one latent curing catalyst for the at least one polyfunctional epoxy resin, at least one alkali-resistant filler and at least one surfactant, wherein the composition is substantially free from acid anhydride and said composition exhibits a viscosity of 10 poise or less at 100° C. whereby said cured resin exhibits high alkali resistance in contact with concrete.

7. A molded coil for use in contact with concrete comprising an electric conductor in the form of a coil, an insulating layer wound around the electric conductor, and a cured resin molded integrally with the electric conductor and the insulating layer, said cured resin being a cured product of a resin composition consists essentially of at least one polyfunctional epoxy resin as the sole resin in said composition, at least one latent curing catalyst for the at least one polyfunctional epoxy resin, at least one alkali-resistant filler and at least one surfactant, which composition is such that the half-life of the flexural strength of a heat-cured product obtained by heating the composition at 180° C. is 100 days or more when the heat-cured product is brought into contact with concrete in an atmosphere of 60° C. and 100% RH; said resin composition exhibiting a viscosity of 10 poise or less at 100° C. and being substantially free from acid anhydride.

8. A molded coil for use in contact with concrete comprising an electric conductor in the form of a coil, an insulating layer wound around the electric conductor, and a cured resin molded integrally with the electric conductor and the insulating layer, said cured resin being a cured product of a resin composition consisting essentially of at least one polyfunctional epoxy resin, at least one latent curing catalyst for the at least one polyfunctional epoxy resin, at least one alkali-resistant filler and at least one surfactant, which composition is such that the half-life of the flexural strength of a heat-cured product obtained by heating the composition at 180° C. is 100 days or more when the heat-cured product is immersed in an alkali solution having a temperature of 60° C. and a pH of 13; said resin composition exhibiting a viscosity of 10 poise or less at 100° C. and being substantially free from acid anhydride.

* * * * *